US012689145B2

(12) United States Patent
Morishita et al.

(10) Patent No.: US 12,689,145 B2

(45) Date of Patent: Jul. 21, 2026

(54) ELECTRICAL CONNECTOR WITH TERMINALS HAVING PARTIAL PLATING BY WEIGHTING THICKNESS

(71) Applicant: HIROSE ELECTRIC CO., LTD., Yokohama (JP)

(72) Inventors: Takuya Morishita, Yokohama (JP); Namiki Toyosu, Yokohama (JP)

(73) Assignee: HIROSE ELECTRIC CO., LTD., Yokohama (JP)

( * ) Notice: Subject to any disclaimer, the term of this patent is extended or adjusted under 35 U.S.C. 154(b) by 336 days.

(21) Appl. No.: 18/640,784

(22) Filed: Apr. 19, 2024

(65) Prior Publication Data

US 2024/0364040 A1 Oct. 31, 2024

(30) Foreign Application Priority Data

Apr. 27, 2023 (JP) ................................. 2023-073573

(51) Int. Cl.

*H01R 13/405* (2006.01)
*H01R 12/71* (2011.01)
*H01R 13/03* (2006.01)

(52) U.S. Cl.

CPC ......... *H01R 13/405* (2013.01); *H01R 12/716* (2013.01); *H01R 13/03* (2013.01)

(58) Field of Classification Search

None

See application file for complete search history.

(56) References Cited

U.S. PATENT DOCUMENTS 11,342,715 B2 * 5/2022 Hayashi ............. H01R 13/6587
2008/0057794 A1 3/2008 Goto et al.

FOREIGN PATENT DOCUMENTS

JP 4287450 B2 7/2009

* cited by examiner

*Primary Examiner* — Tho D Ta

(74) *Attorney, Agent, or Firm* — Rankin, Hill & Clark LLP

(57) ABSTRACT

An electrical connector includes a housing and a fitting, each terminal of the fitting includes a mounting portion, a first wall, a second wall, and a third wall and is configured to come into contact with a counterpart terminal by at least two contact points including a first contact point and a second contact point, a first wall surface of the first wall and an exposed surface of the third wall are plated after insert molding, and a first thickness of a plated portion on the first wall surface is greater than a second thickness of a plated portion on the exposed surface of the third wall.

14 Claims, 25 Drawing Sheets

2A

ELECTRICAL CONNECTOR WITH TERMINALS HAVING PARTIAL PLATING BY WEIGHTING THICKNESS

BACKGROUND OF THE INVENTION

Field of the Invention

The present invention relates to an electrical connector and, particularly, to an electrical connector to be mounted to an electrically-connected mounted object such as a circuit board and an electric cable.

Description of the Related Art

Conventionally, as an electrical connector to be mounted to an electrically-connected mounted object such as a circuit board and an electric cable, for example, an electrical connector is known which is manufactured by having a plurality of terminal portions integrally provided with a carrier being integrally molded with a housing so as to be held by the housing, plating the terminal portions held by the housing, and subsequently separating the electrical connector from the carrier, as described in Japanese Patent No. 4287450 (Japanese Patent Laid-Open No. 2008-059884).

In the conventional electrical connector described in Japanese Patent No. 4287450 (Japanese Patent Laid-Open No. 2008-059884), since exposed surfaces of the terminals which are not in contact with the housing are plated, the terminals exhibit favorable electrical contact characteristics and solder-adhering characteristics. On the other hand, since contact surfaces of the terminals which are in contact with the housing are not plated, solder and flux are less likely to enter into the gap formed between the housing and the contact surfaces of the terminals.

The conventional electrical connector described above has a problem in that when, after fittings (such as terminals and reinforcement fittings) are integrally molded with the housing and held by the housing, the entire fittings are plated, manufacturing costs related to the plating and the like increase.

In particular, a recent problem needed to be solved is that when adopting an expensive plate with relatively high conductivity or an expensive plate with relatively high solder wettability as the plate to be used in plating, how to perform partial plating by weighting thickness of the plating (plating thickness) more or less according to degrees of importance of required conductivity, solder wettability, or the like with respect to each plated portion to be subjected to plating in a terminal of a fitting to be held by a housing in order to reduce manufacturing costs.

In consideration thereof, the present invention has been made in order to solve the problem in the prior art described above and the recent problem needed to be solved and an object of the present invention is to provide an electrical connector capable of reducing manufacturing costs by performing partial plating for each part of a terminal of a fitting integrally molded with and held by a housing by weighting plating thickness in accordance with an application of the part.

SUMMARY OF THE INVENTION

In order to solve the problem described above, the present invention provides an electrical connector comprising: a housing including a lengthwise direction, a crosswise direction, and a height direction which are mutually orthogonal; and a fitting held by the housing; wherein the fitting is integrally molded with the housing by insert molding, the fitting is made of a conductive thin plate-shaped base material held by the housing, and the fitting includes a terminal of which surface is to be partially plated after the insert molding and a reinforcement fitting which is connected to the terminal and which at least reinforces the housing, the terminal includes: a mounting portion; a first wall; a second wall; and a third wall; the mounting portion including a mounting surface which is to be mounted to a mounted object, the first wall being provided so as to extend in a first direction orthogonal to the mounting surface and forming a first wall surface including a first contact point configured to independently come into contact with a counterpart terminal, the second wall being provided so as to oppose the first wall in a second direction orthogonal to the first direction and forming a second wall surface including a second contact point not coming into contact or being configured to come into contact in an auxiliary manner with the counterpart terminal, and the third wall being provided at a distal side end to the mounting portion in the second wall in the first direction and forming an exposed surface being spaced apart from the mounting surface in the first direction and not coming into contact with the housing, the terminal being configured to come into contact with the counterpart terminal by at least two contact points including the first contact point and the second contact point, and a first thickness of a plated portion on the first wall surface is greater than a second thickness of a plated portion on the exposed surface of the third wall.

In addition, the present invention provides an electrical connector to be mounted to an electrically-connected mounted object, the electrical connector including: a housing having a lengthwise direction, a crosswise direction, and a height direction which are mutually orthogonal; and a fitting held by the housing, wherein the fitting is integrally molded with the housing by insert molding, the fitting is made of a conductive thin plate-shaped base material held by the housing, and the fitting includes a terminal of which surface is to be partially plated after the insert molding and a reinforcement fitting which is connected to the terminal and which at least reinforces the housing, the terminal includes: a mounting portion including a mounting surface which is to be mounted to a mounted portion of the mounted object; a first wall which is provided so as to extend in a first direction orthogonal to the mounting surface and which forms a first wall surface including a first contact point capable of independently coming into contact with a counterpart terminal; a second wall which is provided so as to oppose the first wall in a second direction orthogonal to the first direction and which forms a second wall surface including a second contact point not coming into contact or being capable of coming into contact in an auxiliary manner with the counterpart terminal; and a third wall which is provided at a distal side end to the mounting portion in the second wall in the first direction and which forms an exposed surface being spaced apart from the mounting surface in the first direction and not coming into contact with the housing, the terminal being configured to come into contact with the counterpart terminal by at least two contact points including the first contact point and the second contact point, and the mounting surface of the mounting portion and the exposed surface of the third wall are to be plated after the insert molding, and a first thickness of a plated portion having been plated on the mounting surface is greater than a second thickness of a plated portion having been plated on the exposed surface.

With the electrical connector according to the present invention, manufacturing costs can be reduced by performing partial plating for each part of a terminal of a fitting to be integrally molded with and held by a housing, by weighting plating thickness in accordance with an application of the part.

DETAILED DESCRIPTION OF THE PREFERRED EMBODIMENTS

Hereinafter, electrical connectors according to some embodiments of the present invention will be described with reference to the accompanying drawings.

First, an electrical connector 1 according to a first embodiment of the present invention will be described with reference to FIGS. 1 to 10.

Figure 1:
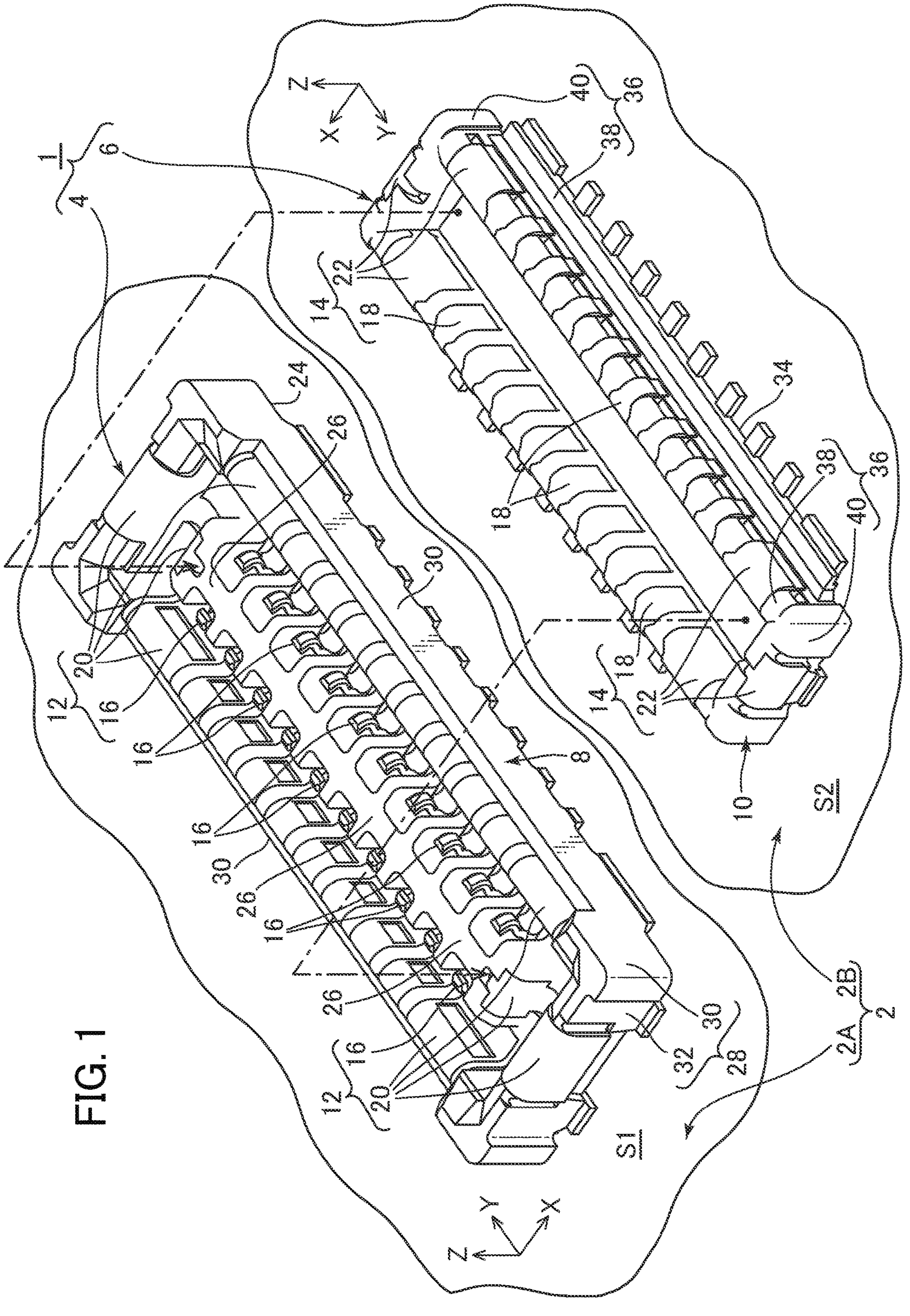
FIG. 1 is a perspective view of an electrical connector in a non-fitted state according to a first embodiment of the present invention.
Figure 2:
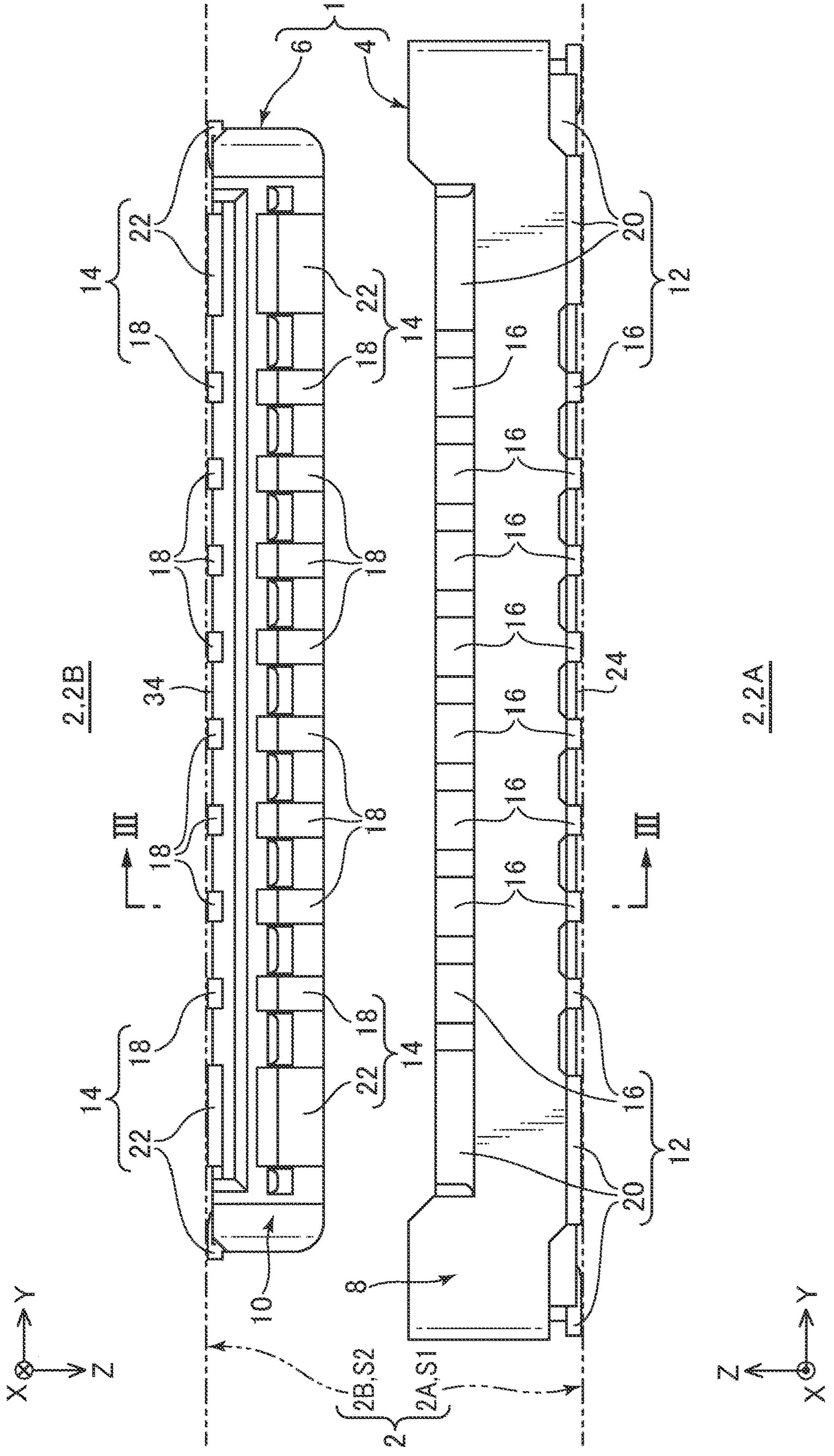
FIG. 2 is a side view of the electrical connector in a non-fitted state according to the first embodiment of the present invention.

As shown in FIGS. 1 and 2, the electrical connector 1 according to the first embodiment of the present invention is to be mounted to a so-called electrically-connected mounted object 2 such as a circuit board of a mobile phone, a smartphone, a digital camera, a notebook personal computer, and other electronic equipment or an electrical connection part of a flexible flat cable.

The electrical connector 1 includes a pair of a receptacle connector 4 and a plug connector 6 which can be fitted to each other and released from each other.

Each of the connectors 4 and 6 is configured to be mounted to each of mounted surfaces S1 and S2 (first mounted surface S1 and second mounted surface S2) in each of different mounted portions 2A and 2B (first mounted portion 2A and second mounted portion 2B) of the mounted object 2 which corresponds to each of the connectors 4 and 6.

In the present specification and in the drawings, in the electrical connector 1, an X-axis direction (hereinafter, an "X direction") among XYZ coordinate axes of a right-handed system constituted of three axes of an X axis, a Y axis, and a Z axis shown in FIG. 1 (as well as other drawings) which are mutually orthogonal is defined as a crosswise direction or a short-side direction of each of the connectors 4 and 6. The X direction corresponds to a normal direction of a YZ plane which is orthogonal to an XY plane constituting each of the mounted surfaces S1 and S2.

In addition, among the XYZ coordinate axes, a Y-axis direction (hereinafter, a "Y direction") is defined as a lengthwise direction or a longitudinal direction of each of the connectors 4 and 6. The Y direction also corresponds to a normal direction of an XZ plane which is orthogonal to the XY plane constituting each of the mounted surfaces S1 and S2.

Furthermore, among the XYZ coordinate axes, a Z-axis direction (hereinafter, a "Z direction") is defined as a height direction of each of the connectors 4 and 6 with respect to each of the mounted surfaces S1 and S2, or a fitting direction or a fitting release direction. The Z direction also corresponds to a normal direction which is orthogonal to the XY plane constituting each of the mounted surfaces S1 and S2.

In particular, a direction in which each of the connectors 4 and 6 approach each other in the Z direction (a direction of movement toward a proximal side) and a direction in which the connectors 4 and 6 fit each other (fitting direction) are assumed to be a "Z1 direction". On the other hand, a direction in which each of the connectors 4 and 6 move away from each other in the Z direction (a direction of movement toward a distal side) and a direction in which the connectors 4 and 6 is released from each other (fitting release direction) are assumed to be a "Z2 direction".

Figure 3:
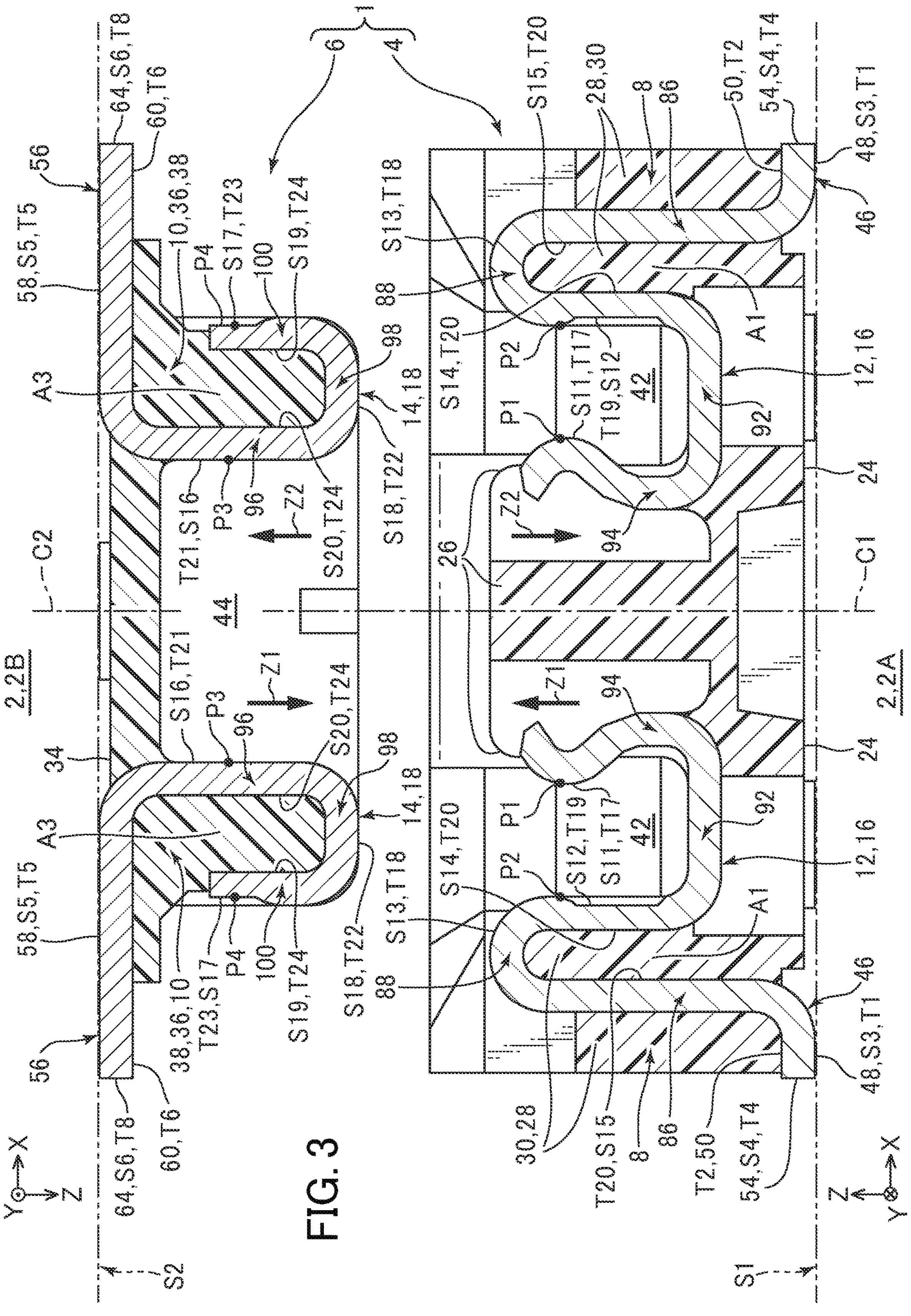
FIG. 3 is a sectional view taken along line III-III in FIG. 2.
Figure 4:
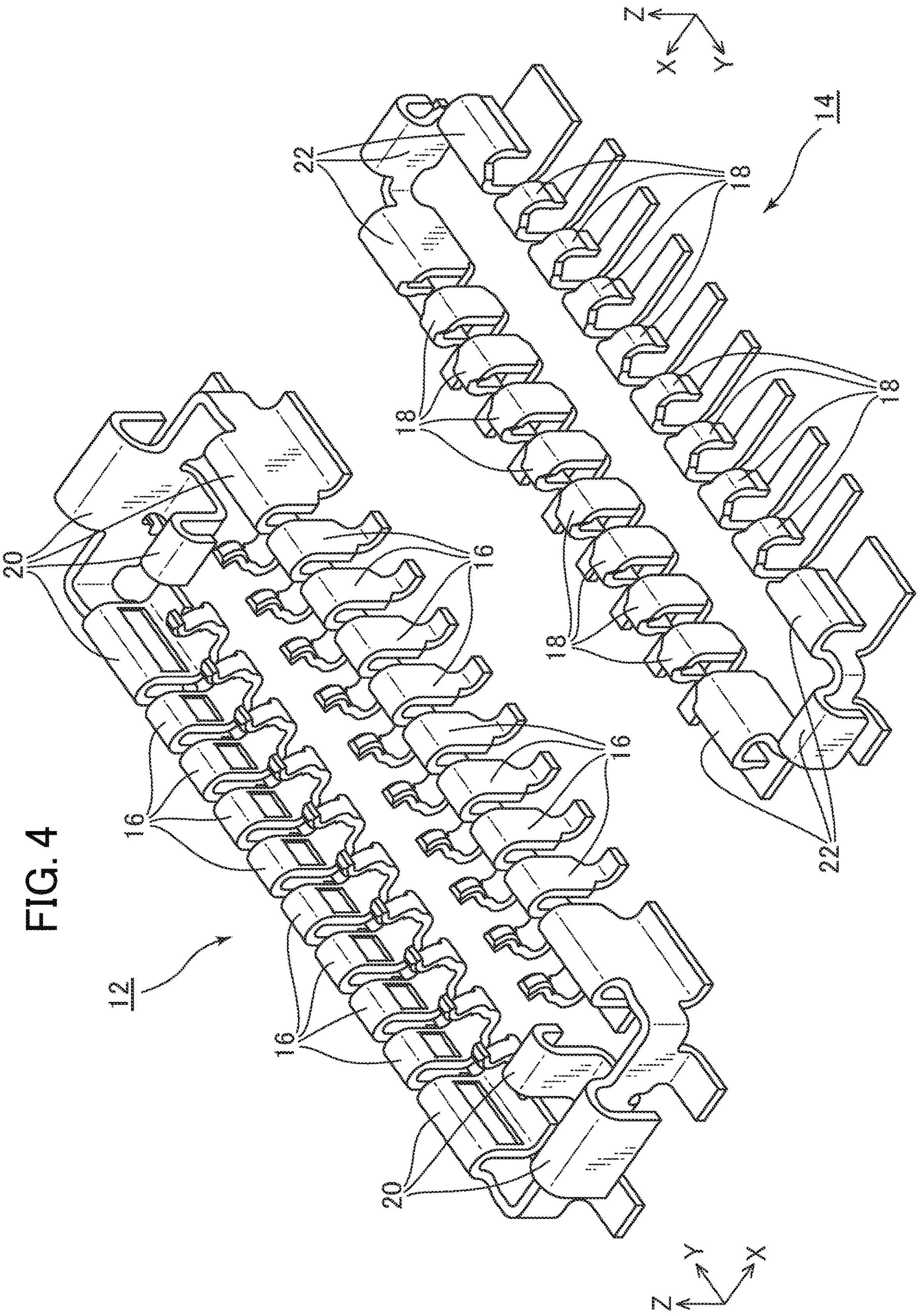
FIG. 4 is a perspective view showing a single fitting for a receptacle connector and a plug connector of the electrical connector according to the first embodiment of the present invention.

Next, as shown in FIGS. 1 to 3, the receptacle connector 4 and the plug connector 6 include, respectively, each of housings 8 and 10 (first housing 8 and second housing 10) which are made of resin and which have a substantially flat, rectangular shape, and fittings 12 and 14 (first fitting 12 and second fitting 14) which are held by each of the housings 8 and 10.

In addition, as shown in FIGS. 1 to 4, each of the fittings 12 and 14 of each of the connectors 4 and 6 is integrally molded with each of the housings 8 and 10 by insert molding, the fittings 12 and 14 are made of a conductive thin plate-shaped base material held by each of the housings 8 and 10, and each of the fittings 12 and 14 includes, respectively, terminals 16 and 18 (first terminal 16 (receptacle terminal 16) and second terminal 18 (plug terminal 18)) and reinforcement fittings 20 and 22 (first reinforcement fitting 20 and second reinforcement fitting 22).

Furthermore, after each of the fittings 12 and 14 is integrally molded with each of the housings 8 and 10 by insert molding, a surface of each of the terminals 16 and 18 is to be partially plated.

Moreover, each of the reinforcement fittings 20 and 22 is integrally connected to a part of each of the housings 8 and 10 so as to at least reinforce each of the housings 8 and 10.

Details of the portion of each of the terminals 16 and 18 to be partially plated and each of the reinforcement fittings 20 and 22 in each of the fittings 12 and 14 of the receptacle connector 4 and the plug connector 6 will be described later.

Next, details of each of the housings 8 and 10 of the receptacle connector 4 and the plug connector 6 will be described with reference to FIGS. 1 to 6B.

As shown in FIGS. 1 to 6B, each of the housings 8 and 10 respectively has a lengthwise direction (Y direction, longitudinal direction), a crosswise direction (X direction, short-side direction), and a height direction (Z direction) which are mutually orthogonal.

In addition, as shown in FIGS. 1 to 5B, the first housing 8 of the receptacle connector 4 includes a bottom wall 24 which is arranged on the first mounted surface S1 of the first mounted portion 2A of the electrically-connected mounted object 2 which is a circuit board of an electronic equipment, an electrical connection part of a flexible flat cable, or the like, and a protruding wall 26 which protrudes in a Z direction (fitting direction Z1) from a center part of the bottom wall 24 in the X direction.

Furthermore, the first housing 8 includes a peripheral wall 28 which is provided in an outer frame shape along an entire periphery of the first housing 8 on outside of an outer periphery of the protruding wall 26 in the X direction and the Y direction at an interval. The peripheral wall 28 includes a longitudinal wall 30 which extends in the Y direction (longitudinal direction) of the first housing 8 and a short-side wall 32 which extends in the X direction (short-side direction) of the first housing 8.

The longitudinal wall 30 and the short-side wall 32 of the peripheral wall 28 are also formed so as to protrude in the Z direction (fitting direction Z1) from the bottom wall 24.

In addition, each terminal 16 and each reinforcement fitting 20 of the first fitting 12 are configured to be integrally assembled onto the first housing 8 by being integrally molded onto each of the walls 24, 26, 28, 30, and 32 of the first housing 8 by insert molding.

In a similar manner, as shown in FIGS. 1 to 4, 6A, and 6B, the second housing 10 of the plug connector 6 includes a bottom wall 34 which is arranged on the second mounted surface S2 of the second mounted portion 2B of the electrically-connected mounted object 2 which is a circuit board of an electronic equipment, an electrical connection part of a flexible flat cable, or the like.

In addition, the second housing 10 includes a peripheral wall 36 which is provided in an outer frame shape along an entire periphery of the second housing 10 and which protrudes from the bottom wall 34 towards the Z direction (fitting direction Z1). The peripheral wall 36 includes a longitudinal wall 38 which extends in the Y direction (longitudinal direction) of the second housing 10 and a short-side wall 40 which extends in the X direction (short-side direction) of the second housing 10.

Furthermore, each terminal 18 and each reinforcement fitting 22 of the second fitting 14 are configured to be integrally assembled onto the second housing 10 by being integrally molded onto each of the walls 34, 36, 38, and 40 of the second housing 10 by insert molding.

Figure 5A:
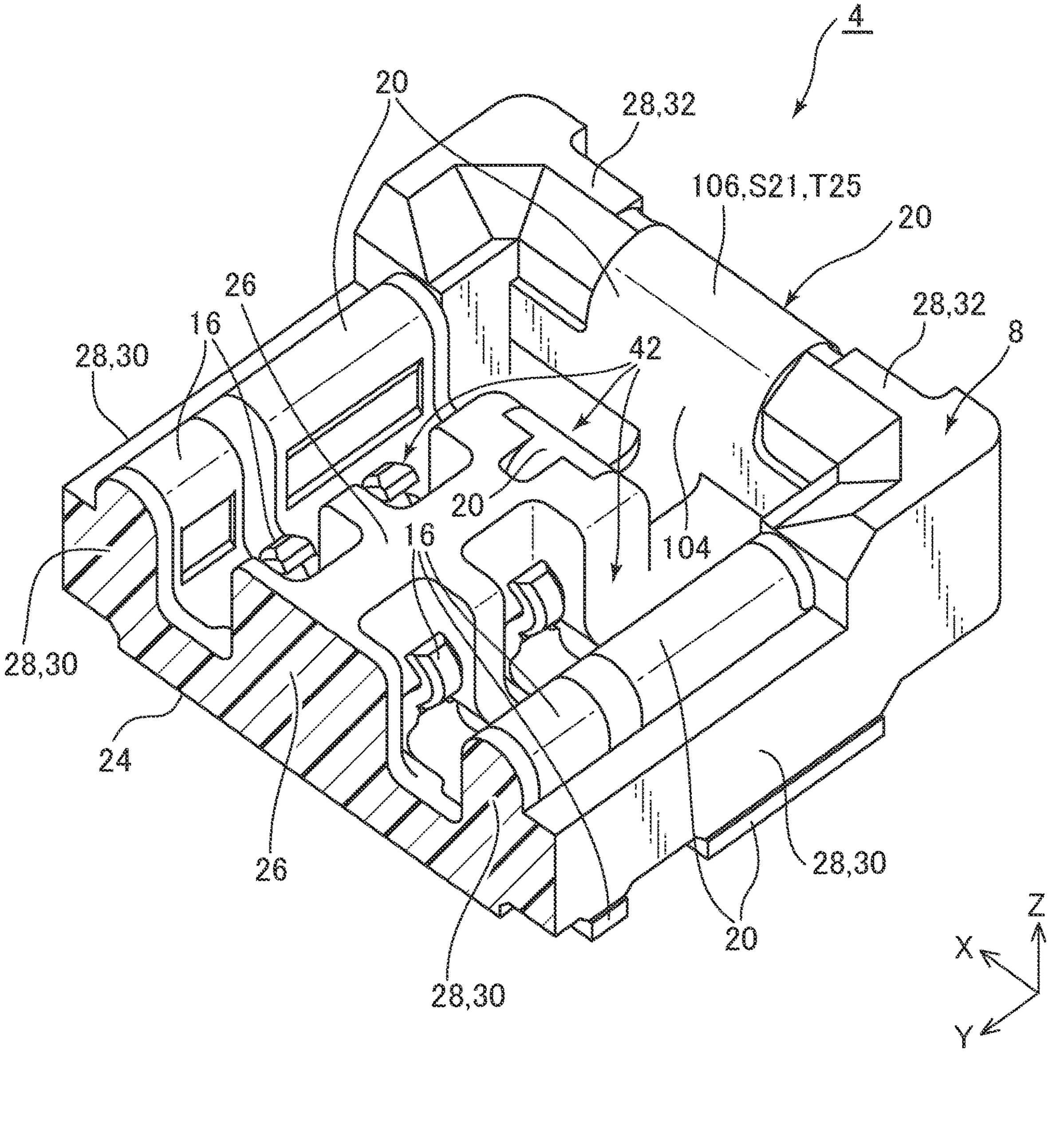
FIG. 5A is a partially enlarged perspective view of a part of the receptacle connector of the electrical connector according to the first embodiment of the present invention as viewed from a counterpart connector side thereof (the plug connector side)
Figure 5B:
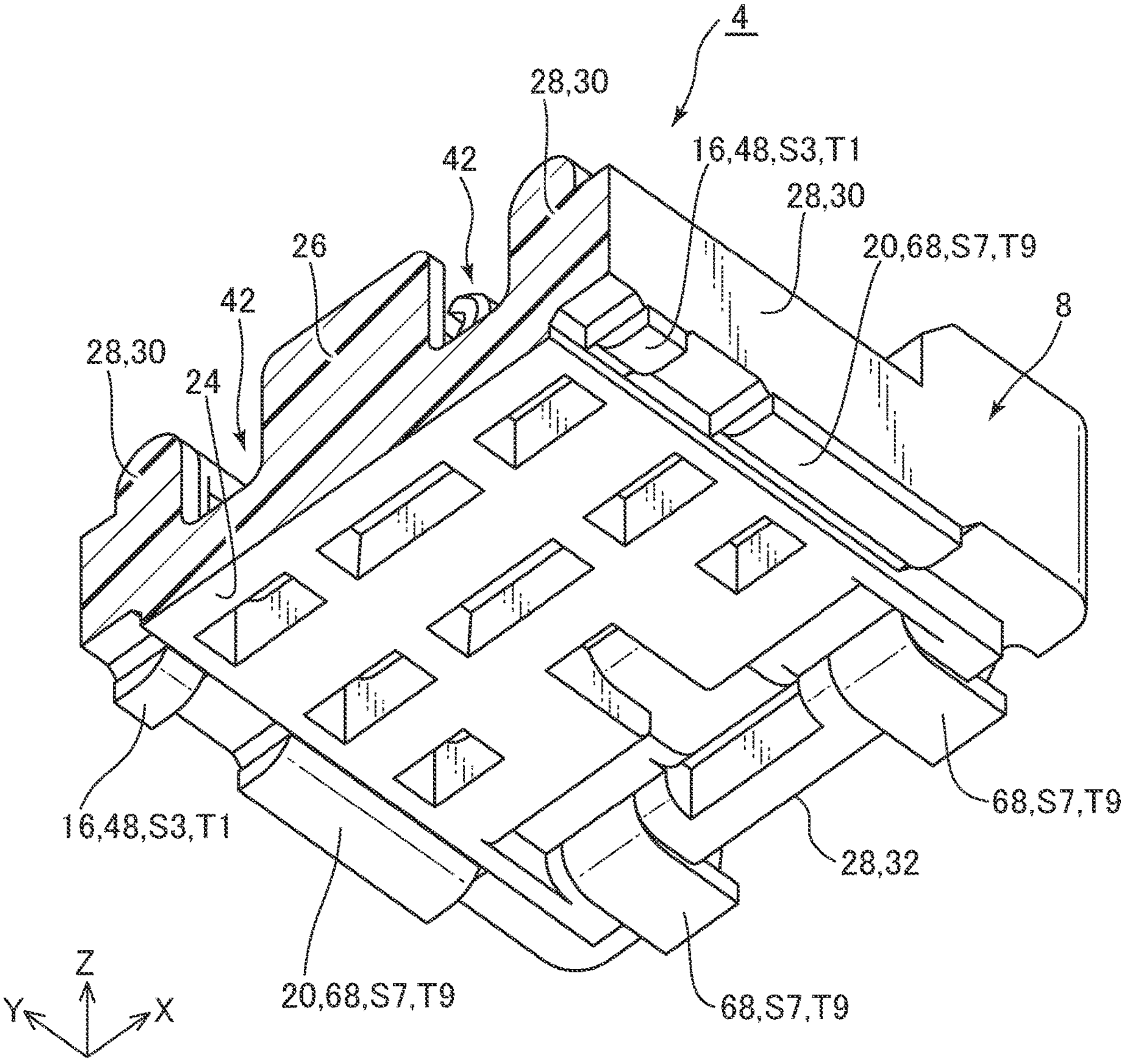
FIG. 5B is a partially enlarged perspective view of a part of the receptacle connector of the electrical connector according to the first embodiment of the present invention as viewed from a mounted portion side thereof.

Next, as shown in FIGS. 3, 5A, and 5B, a first fitting depression 42 which can receive the peripheral wall 36 of the second housing 10 of the plug connector 6 when the plug connector 6 is fitted to the receptacle connector 4 is provided between the protruding wall 26 and the peripheral wall 28 of the first housing 8 of the receptacle connector 4.

Figure 6A:
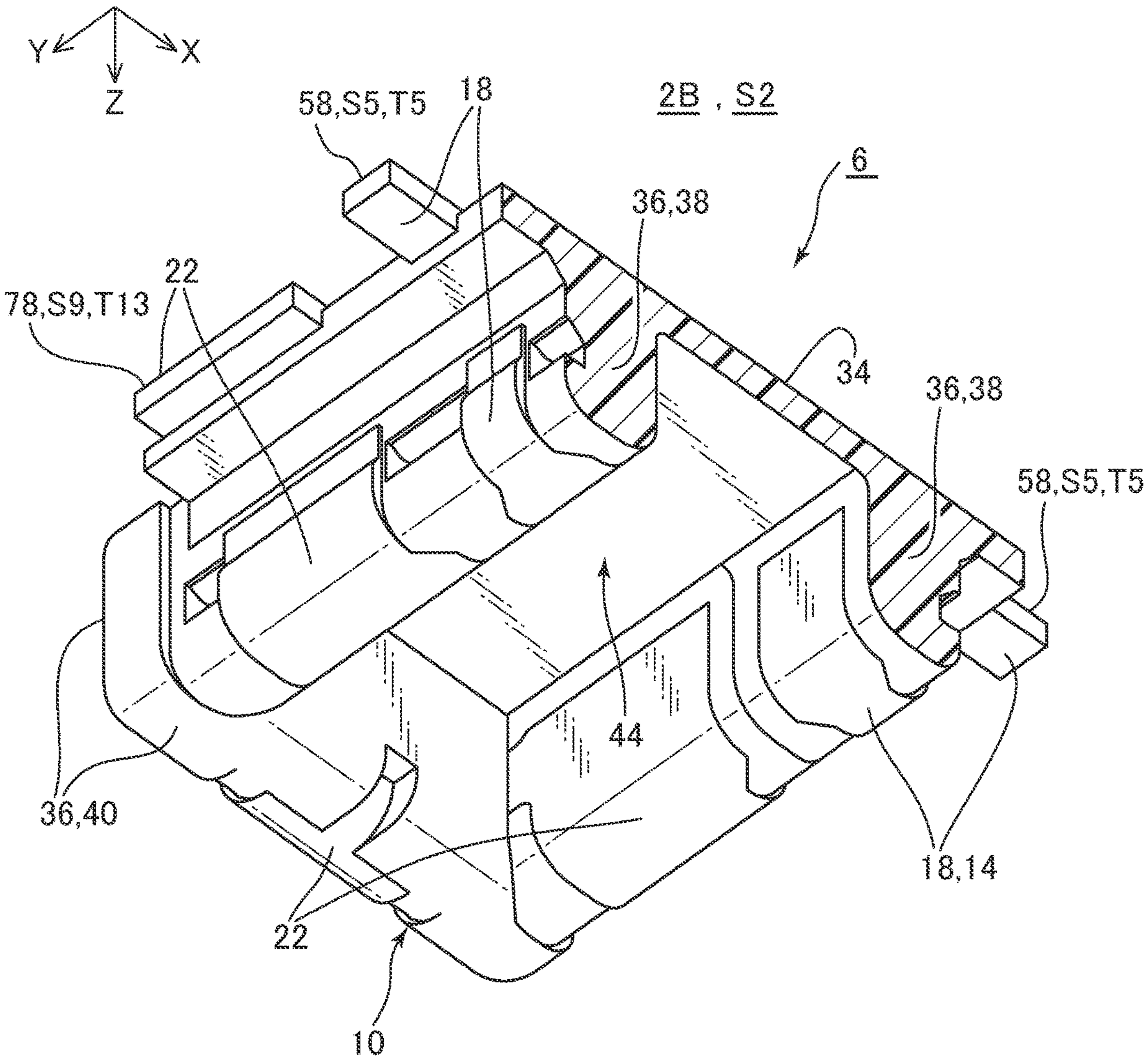
FIG. 6A is a partial perspective view of a part of the plug connector of the electrical connector according to the first embodiment of the present invention as viewed from a counterpart connector side thereof (the receptacle connector side)
Figure 6B:
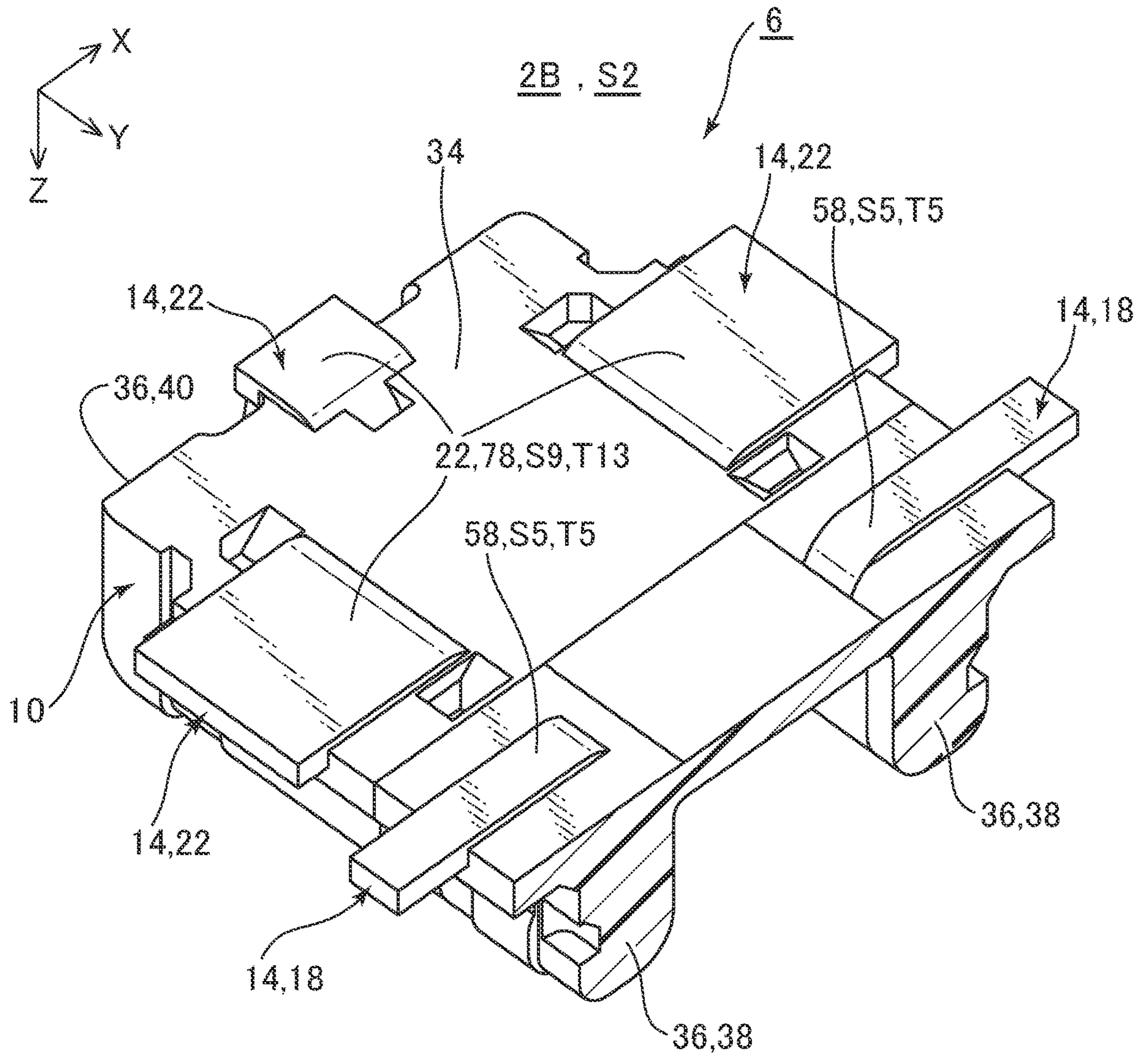
FIG. 6B is a partial perspective view of a part of the plug connector of the electrical connector according to the first embodiment of the present invention as viewed from a mounted portion side thereof.

In addition, as shown in FIGS. 3, 6A, and 6B, a second fitting depression 44 which can receive the protruding wall 26 of the first housing 8 of the receptacle connector 4 when the plug connector 6 is fitted to the receptacle connector 4 is provided on respective inner peripheral sides of the longitudinal wall 38 and the short-side wall 40 of the peripheral wall 36 of the second housing 10 of the plug connector 6.

While the electrical connector 1 according to the present embodiment is described to have a form in which a length of each of the longitudinal walls 30 and 38 in the Y direction (longitudinal direction) is longer than a length of each of the short-side walls 32 and 40 in the X direction (short-side direction) in each of the peripheral walls 28 and 36 of each of the housings 8 and 10, the electrical connector 1 is not limited to this form and the length of each of the longitudinal walls 30 and 38 in the Y direction (longitudinal direction) and the length of each of the short-side walls 32 and 40 in the X direction (short-side direction) may be the same.

Next, details of the portion of each of the terminals 16 and 18 to be partially plated and each of the reinforcement fittings 20 and 22 in each of the fittings 12 and 14 of the receptacle connector 4 and the plug connector 6 of the electrical connector 1 according to the present embodiment will be described with reference to FIGS. 1 to 10B.

First, as shown in FIGS. 3 and 7A to 7C, the first terminal 16 of the receptacle connector 4 includes a first mounting portion 46 to be mounted to the first mounted portion 2A of the mounted object 2. The first mounting portion 46 includes a first surface 48 which is provided on one side of the thin plate-shaped base material of the first mounting portion 46 in the thickness direction (Z direction) (a lower side of the first mounting portion 46 shown in FIGS. 3 and 7C, the first mounted portion 2A side) and which forms a first mounting surface S3 that opposes the first mounted surface S1 of the first mounted portion 2A.

In addition, the first mounting portion 46 includes a second surface 50 which is provided on another side of the thin plate-shaped base material of the first mounting portion 46 in the thickness direction (Z direction) (an upper side of the first mounting portion 46 shown in FIGS. 3 and 7C) and which is positioned on an opposite side to the first mounting surface S3 in the thickness direction (Z direction).

Furthermore, the first surface 48 and the second surface 50 of the first mounting portion 46 are subjected to plating after the first fitting 12 is insert-molded with the first housing 8 and held by the first housing 8.

At this point, a first thickness T1 of a plated portion which has been plated on the first surface 48 of the first mounting portion 46 is set to be greater than a second thickness T2 of a plated portion which has been plated on the second surface 50 (T1>T2).

Note that the first thickness T1 is preferably set to 0.05 μm to 0.08 μm and the second thickness T2 is preferably set to 0.03 μm or less.

Next, as shown in FIGS. 3 and 7A to 7C, the first mounting portion 46 of the first terminal 16 of the receptacle connector 4 further includes a third surface 52 provided on both sides in a direction (Y direction) which is orthogonal to the thickness direction (Z direction) with respect to the first surface 48 and the second surface 50 of the first mounting portion 46.

The third surface 52 has a third thickness T3 of a plated portion having been plated after insert molding.

In addition, the third thickness T3 is set to be smaller than the first thickness T1 and set to be greater than the second thickness T2 (T1>T3>T2).

Note that the third thickness T3 is preferably set to 0.05 μm to 0.06 μm.

Next, as shown in FIGS. 3 and 7A to 7C, the first mounting portion 46 of the first terminal 16 of the receptacle connector 4 further includes a fourth surface 54 which is orthogonal to the first surface 48, the second surface 50, and the third surface 52 of the first mounting portion 46.

The fourth surface 54 forms a fracture surface S4 by being fractured after the first mounting portion 46 is plated after insert molding.

In addition, a fourth thickness T4 of a plated portion which has been plated on the fracture surface S4 is set to be smaller than the second thickness T2 and equal to 0 (T2>T4=0).

Next, as shown in FIGS. 3 and 8A to 8C, the second terminal 18 of the plug connector 6 includes a second mounting portion 56 to be mounted to the second mounted portion 2B of the mounted object 2. The second mounting portion 56 includes a first surface 58 which is provided on one side of the thin plate-shaped base material of the second mounting portion 56 in the thickness direction (Z direction) (an upper side of the mounting portion 56 shown in FIGS. 3 and 8C, the second mounted portion 2B side) and which forms a second mounting surface S5 that opposes the second mounted surface S2 of the second mounted portion 2B.

In addition, the second mounting portion 56 includes a second surface 60 which is provided on another side of the thin plate-shaped base material of the second mounting portion 56 in the thickness direction (Z direction) (a lower side of the second mounting portion 56 shown in FIGS. 3 and 8C) and which is positioned on an opposite side to the second mounting surface S5 in the thickness direction (Z direction).

Furthermore, the first surface 58 and the second surface 60 of the second mounting portion 56 are subjected to plating after the second fitting 14 is insert-molded with the second housing 10 and held by the second housing 10.

At this point, a first thickness T5 of a plated portion which has been plated on the first surface 58 of the second mounting portion 56 is set to be greater than a second thickness T6 of a plated portion which has been plated on the second surface 60 (T5>T6).

Note that the first thickness T5 is preferably set to 0.05 μm to 0.08 μm and the second thickness T6 is preferably set to 0.03 μm or less.

Next, as shown in FIGS. 3 and 8A to 8C, the second mounting portion 56 of the second terminal 18 of the plug connector 6 further includes a third surface 62 provided on both sides in a direction (Y direction) which is orthogonal to the thickness direction (Z direction) with respect to the first surface 58 and the second surface 60 of the second mounting portion 56.

The third surface 62 has a third thickness T7 of a plated portion having been plated after insert molding.

In addition, the third thickness T7 is set to be smaller than the first thickness T5 and set to be greater than the second thickness T6 (T5>T7>T6).

Note that the third thickness T7 is preferably set to 0.05 μm to 0.06 μm.

Next, as shown in FIGS. 3 and 8A to 8C, the second mounting portion 56 of the second terminal 18 of the plug connector 6 further includes a fourth surface 64 which is orthogonal to the first surface 58, the second surface 60, and the third surface 62 of the second mounting portion 56.

The fourth surface 64 forms a fracture surface S6 by being fractured after the second mounting portion 56 is plated after insert molding.

In addition, a fourth thickness T8 of a plated portion which has been plated on the fracture surface S6 is set to be smaller than the second thickness T6 and equal to 0 (T6>T8=0).

Figure 9A:
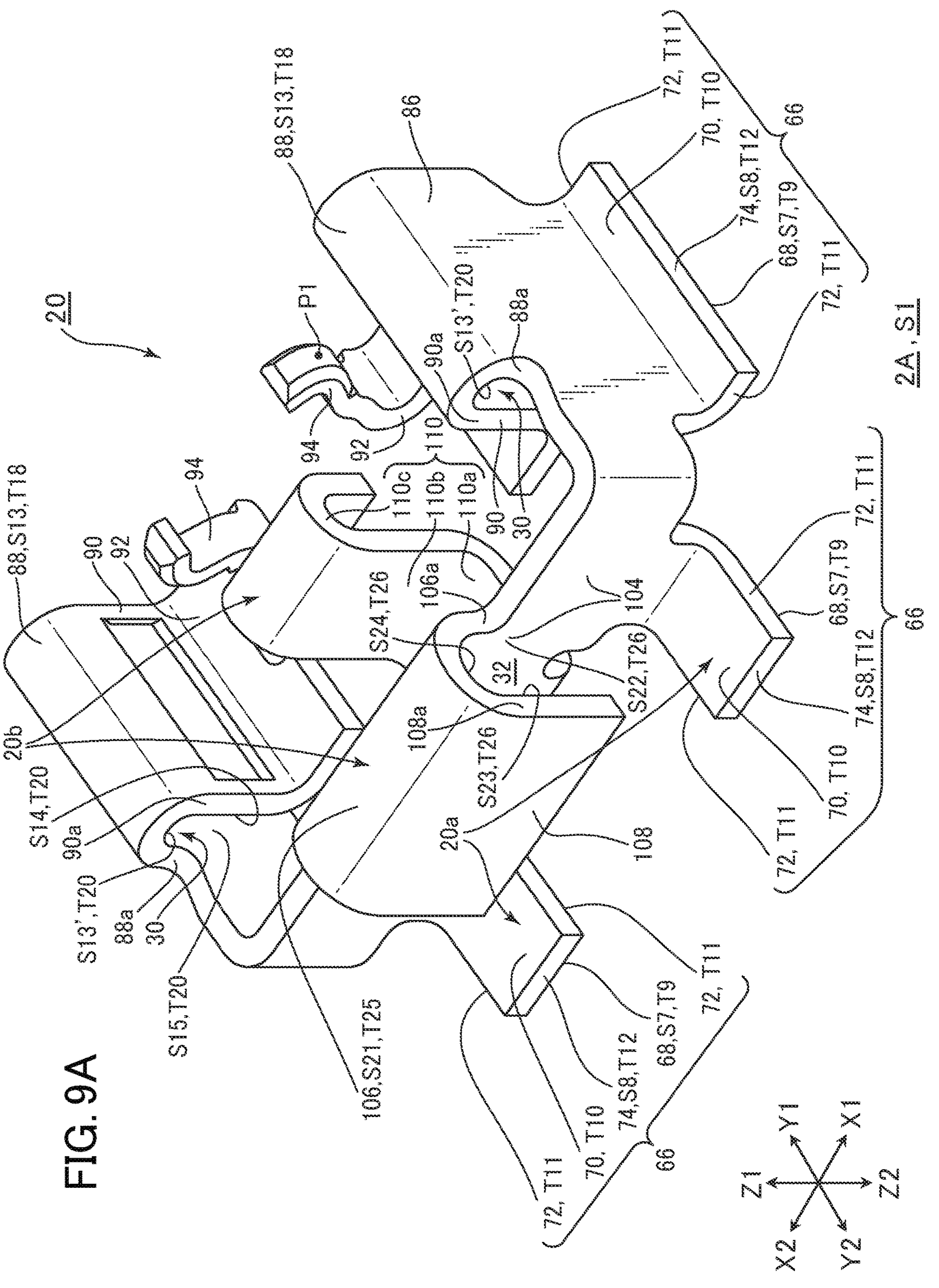
FIG. 9A is a partially enlarged perspective view of a reinforcement fitting portion of the receptacle connector of the electrical connector according to the first embodiment of the present invention as viewed from a counterpart connector side thereof (the plug connector side)
Figure 9B:
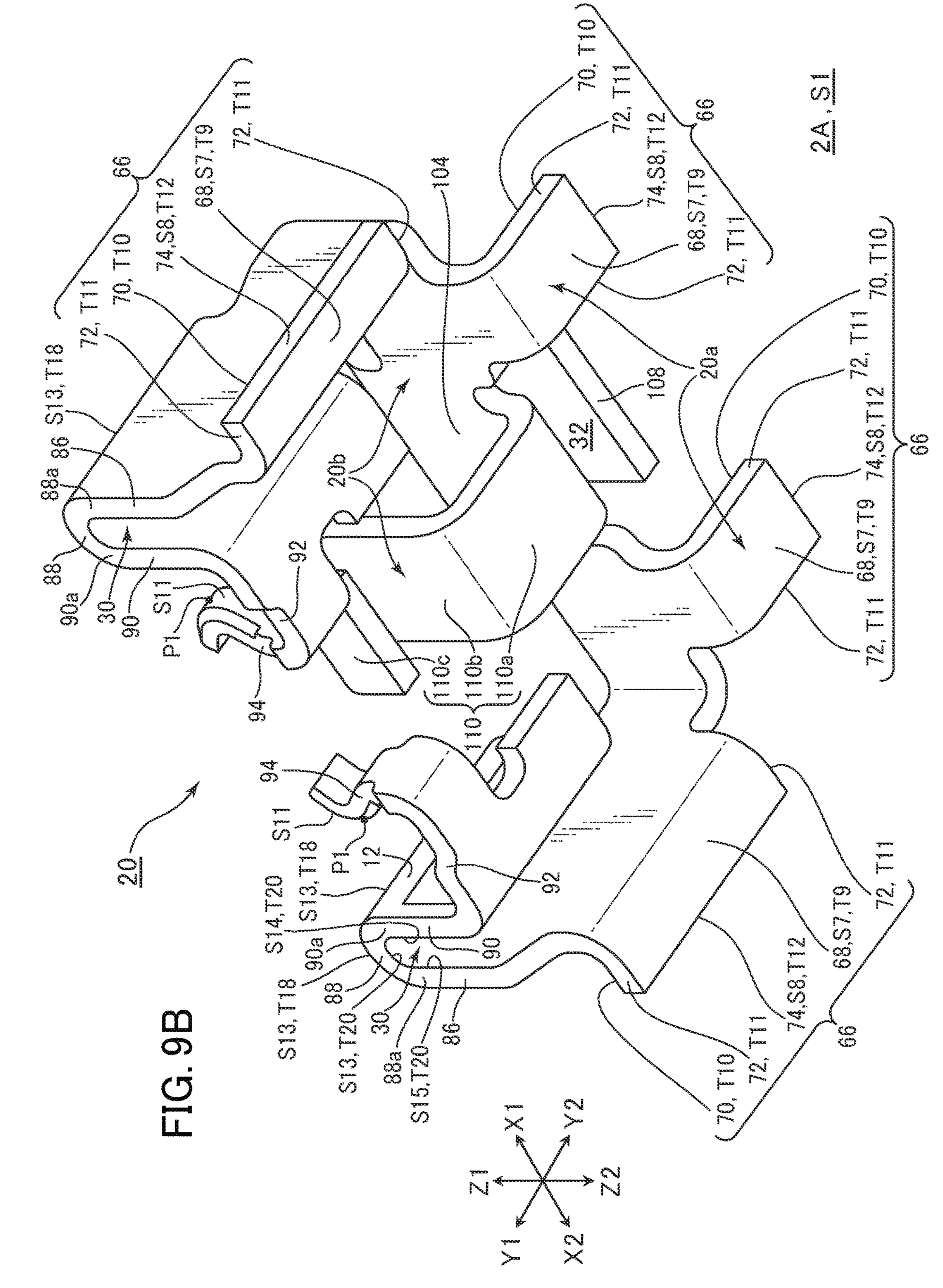
FIG. 9B is a partially enlarged perspective view of the reinforcement fitting portion of the receptacle connector of the electrical connector according to the first embodiment of the present invention as viewed from a mounted portion side thereof.

Next, as shown in FIGS. 9A and 9B, the first reinforcement fitting 20 of the receptacle connector 4 includes a first mounting portion 66 to be mounted to the first mounted portion 2A of the mounted object 2. The first mounting portion 66 includes a first surface 68 which is provided on one side of the thin plate-shaped base material of the first mounting portion 66 in the thickness direction (Z direction) (a lower side of the first mounting portion 66 shown in FIGS. 9A and 9B, a side of the first mounted portion 2A) and which forms a first mounting surface S7 that opposes the first mounted surface S1 of the first mounted portion 2A.

In addition, the first mounting portion 66 includes a second surface 70 which is provided on another side of the thin plate-shaped base material of the first mounting portion 66 in the thickness direction (Z direction) (an upper side of the first mounting portion 66 shown in FIGS. 9A and 9B) and which is positioned on an opposite side to the first mounting surface S7 in the thickness direction (Z direction).

Furthermore, the first surface 68 and the second surface 70 of the first mounting portion 66 are subjected to plating after the first fitting 12 is insert-molded with the first housing 8 and held by the first housing 8.

At this point, a first thickness T9 of a plated portion which has been plated on the first surface 68 of the first mounting portion 66 is set to be greater than a second thickness T10 of a plated portion which has been plated on the second surface 70 (T9>T10).

Note that the first thickness T9 is preferably set to 0.05 μm to 0.08 μm and the second thickness T10 is preferably set to 0.03 μm or less.

Next, as shown in FIGS. 9A and 9B, the first mounting portion 66 of the first reinforcement fitting 20 of the receptacle connector 4 further includes a third surface 72 provided on both sides in a direction (X direction or Y direction) which is orthogonal to the thickness direction (Z direction) with respect to the first surface 68 and the second surface 70 of the first mounting portion 66.

The third surface 72 has a third thickness T11 of a plated portion having been plated after insert molding.

In addition, the third thickness T11 is set to be smaller than the first thickness T9 and set to be greater than the second thickness T10 (T9>T11>T10).

Note that the third thickness T11 is preferably set to 0.05 μm to 0.06 μm.

Next, as shown in FIGS. 9A and 9B, the first mounting portion 66 of the first reinforcement fitting 20 of the receptacle connector 4 further includes a fourth surface 74 which is orthogonal to the first surface 68, the second surface 70, and the third surface 72 of the first mounting portion 66.

The fourth surface 74 forms a fracture surface S8 by being fractured after the first mounting portion 66 is plated after insert molding.

In addition, a fourth thickness T12 of a plated portion which has been plated on the fracture surface S8 is set to be smaller than the second thickness T10 and equal to 0 (T10>T12=0).

Figure 10A:
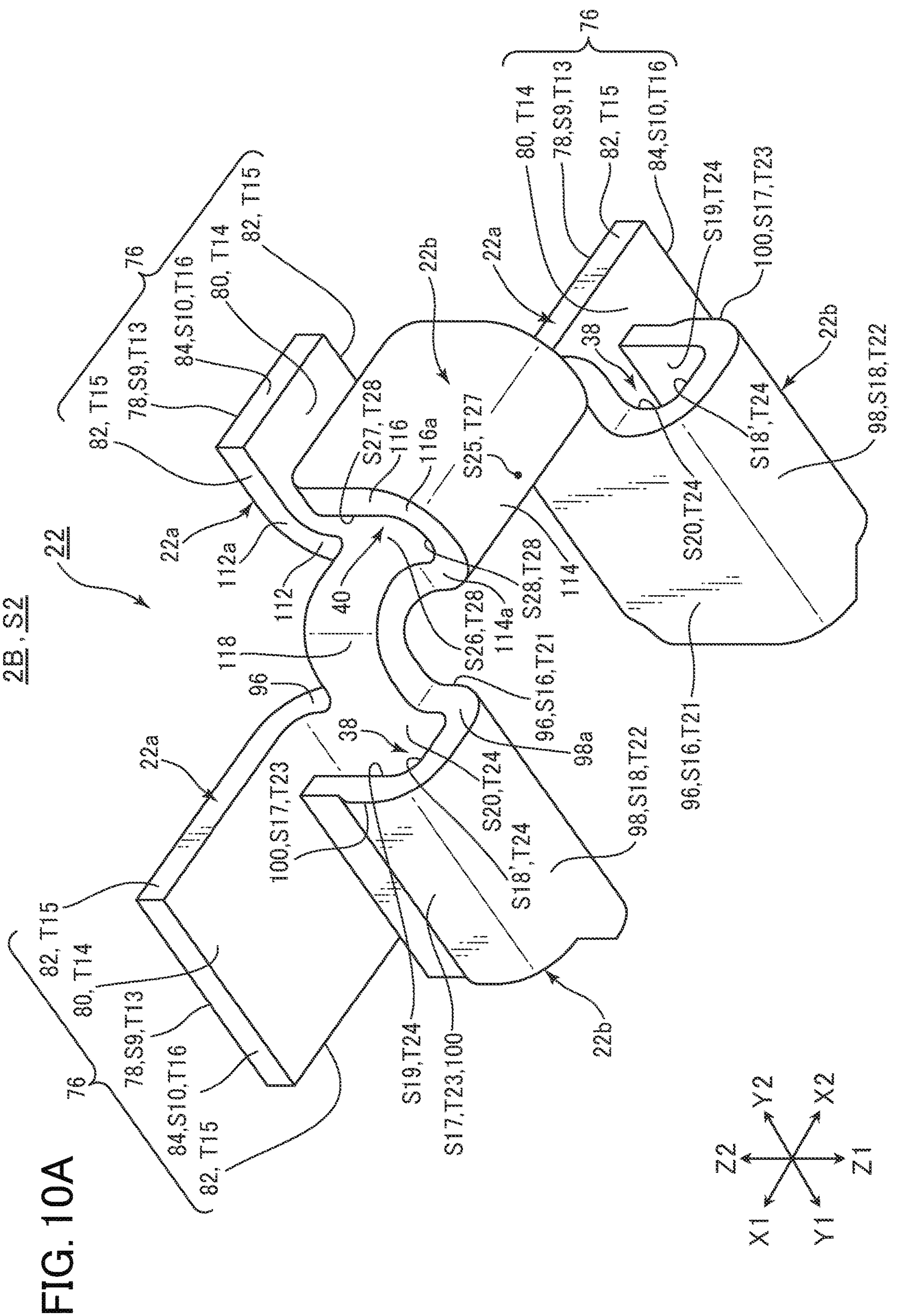
FIG. 10A is a partially enlarged perspective view of a reinforcement fitting portion of the plug connector of the electrical connector according to the first embodiment of the present invention as viewed from a counterpart connector side thereof (the receptacle connector side)
Figure 10B:
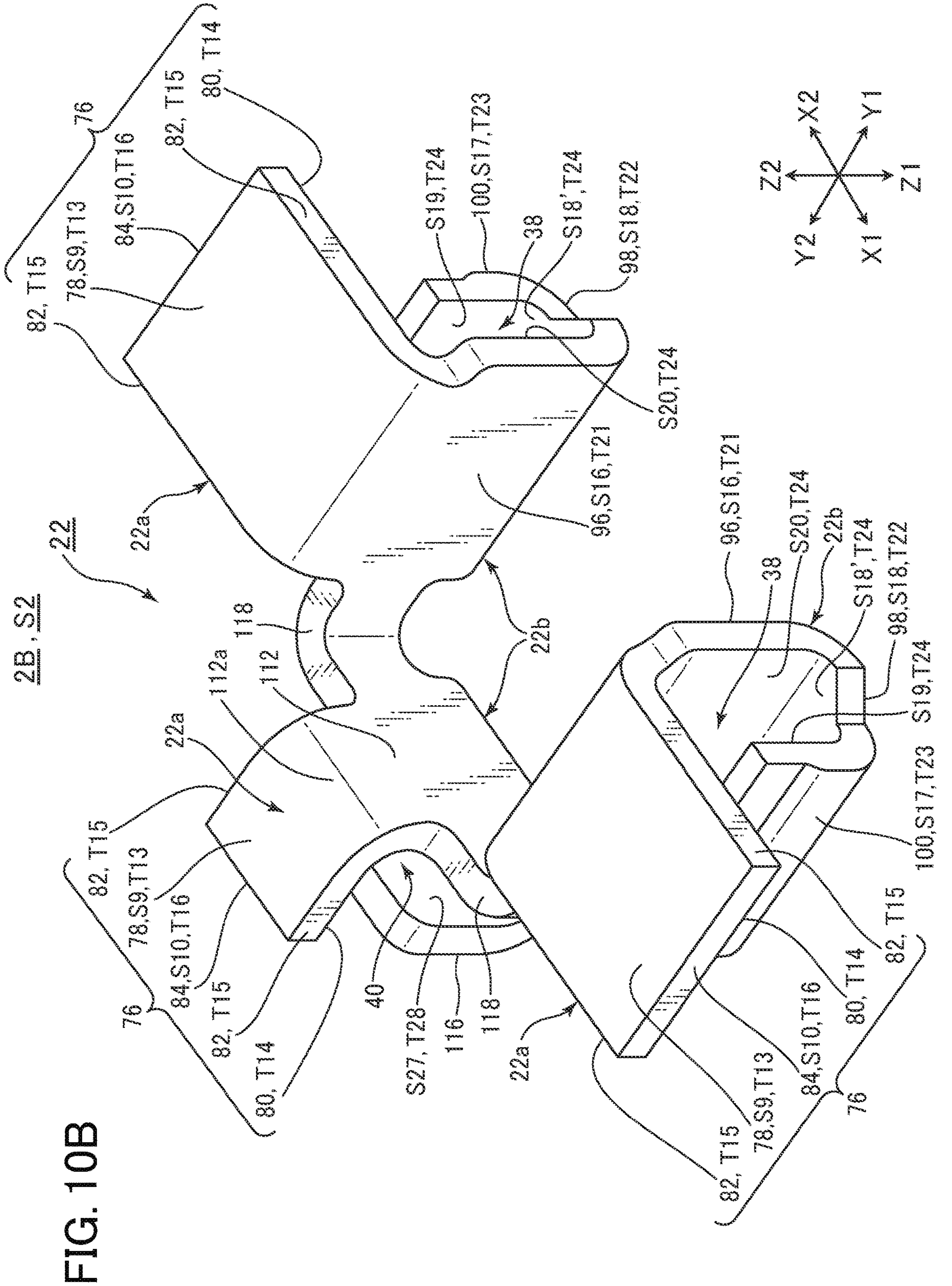
FIG. 10B is a partially enlarged perspective view of the reinforcement fitting portion of the plug connector of the electrical connector according to the first embodiment of the present invention as viewed from a mounted portion side thereof.

Next, as shown in FIGS. 10A and 10B, the second reinforcement fitting 22 of the plug connector 6 includes a second mounting portion 76 to be mounted to the second mounted portion 2B of the mounted object 2. The second mounting portion 76 includes a first surface 78 which is provided on one side of the thin plate-shaped base material of the second mounting portion 76 in the thickness direction (Z direction) (an upper side of the second mounting portion 76 shown in FIGS. 10A and 10B, the second mounted portion 2B side) and which forms a second mounting surface S9 that opposes the second mounted surface S2 of the second mounted portion 2B.

In addition, the second mounting portion 76 includes a second surface 80 which is provided on another side of the thin plate-shaped base material of the second mounting portion 76 in the thickness direction (Z direction) (a lower side of the second mounting portion 76 shown in FIGS. 10A and 10B) and which is positioned on an opposite side to the second mounting surface S9 in the thickness direction (Z direction).

Furthermore, the first surface 78 and the second surface 80 of the second mounting portion 76 are subjected to plating after the second fitting 14 is insert-molded with the second housing 10 and held by the second housing 10.

At this point, a first thickness T13 of a plated portion which has been plated on the first surface 78 of the second mounting portion 76 is set to be greater than a second thickness T14 of a plated portion which has been plated on the second surface 80 (T13>T14).

Note that the first thickness T13 is preferably set to 0.05 μm to 0.08 μm and the second thickness T14 is preferably set to 0.03 μm or less.

Next, as shown in FIGS. 10A and 10B, the second mounting portion 76 of the second reinforcement fitting 22 of the plug connector 6 further includes a third surface 82 provided on both sides in a direction (X direction or Y direction) which is orthogonal to the thickness direction (Z direction) with respect to the first surface 78 and the second surface 80 of the second mounting portion 76.

The third surface 82 has a third thickness T15 of a plated portion having been plated after insert molding.

In addition, the third thickness T15 is set to be smaller than the first thickness T13 and set to be greater than the second thickness T14 (T13>T15>T14).

Note that the third thickness T15 is preferably set to 0.05 μm to 0.06 μm.

Next, as shown in FIGS. 10A and 10B, the second mounting portion 76 of the second reinforcement fitting 22 of the plug connector 6 further includes a fourth surface 84 which is orthogonal to the first surface 78, the second surface 80, and the third surface 82 of the second mounting portion 76.

The fourth surface 84 forms a fracture surface S10 by being fractured after the second mounting portion 76 is plated after insert molding.

In addition, a fourth thickness T16 of a plated portion which has been plated on the fracture surface S10 is set to be smaller than the second thickness T14 and equal to 0 (T14>T16=0).

Next, as shown in FIGS. 3 and 7A to 7C, the first terminal 16 of the receptacle connector 4 includes a mounting wall 46 which is the first mounting portion 46 and further includes generally five walls 86, 88, 90, 92, and 94 (a first wall 86, a second wall 88, a third wall 90, a fourth wall 92, and a fifth wall 94) from the mounting wall 46 toward a central axis C1 which extends in the Z direction in the receptacle connector 4.

Specifically, the first wall 86 bends in the Z direction (fitting direction Z1) from a connecting part 86*a* on a side (opposite side) opposing the fracture surface S4 of the first mounting portion 46 in the X direction, extends for a predetermined distance, and is subsequently connected to the second wall 88.

Figure 7A:
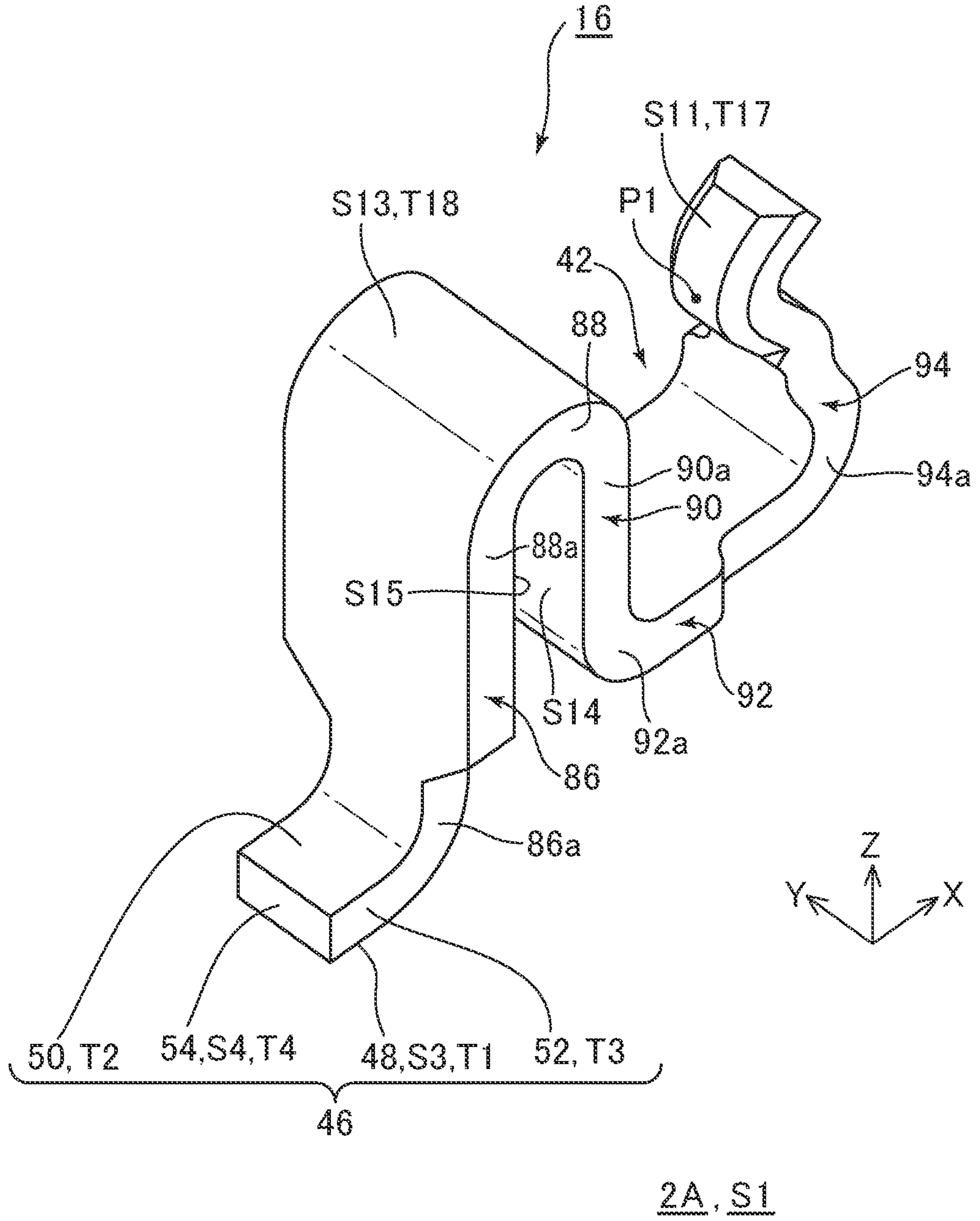
FIG. 7A is a partially enlarged perspective view of a terminal portion of the receptacle connector of the electrical connector according to the first embodiment of the present invention as viewed from a counterpart connector side thereof (the plug connector side)
Figure 7B:
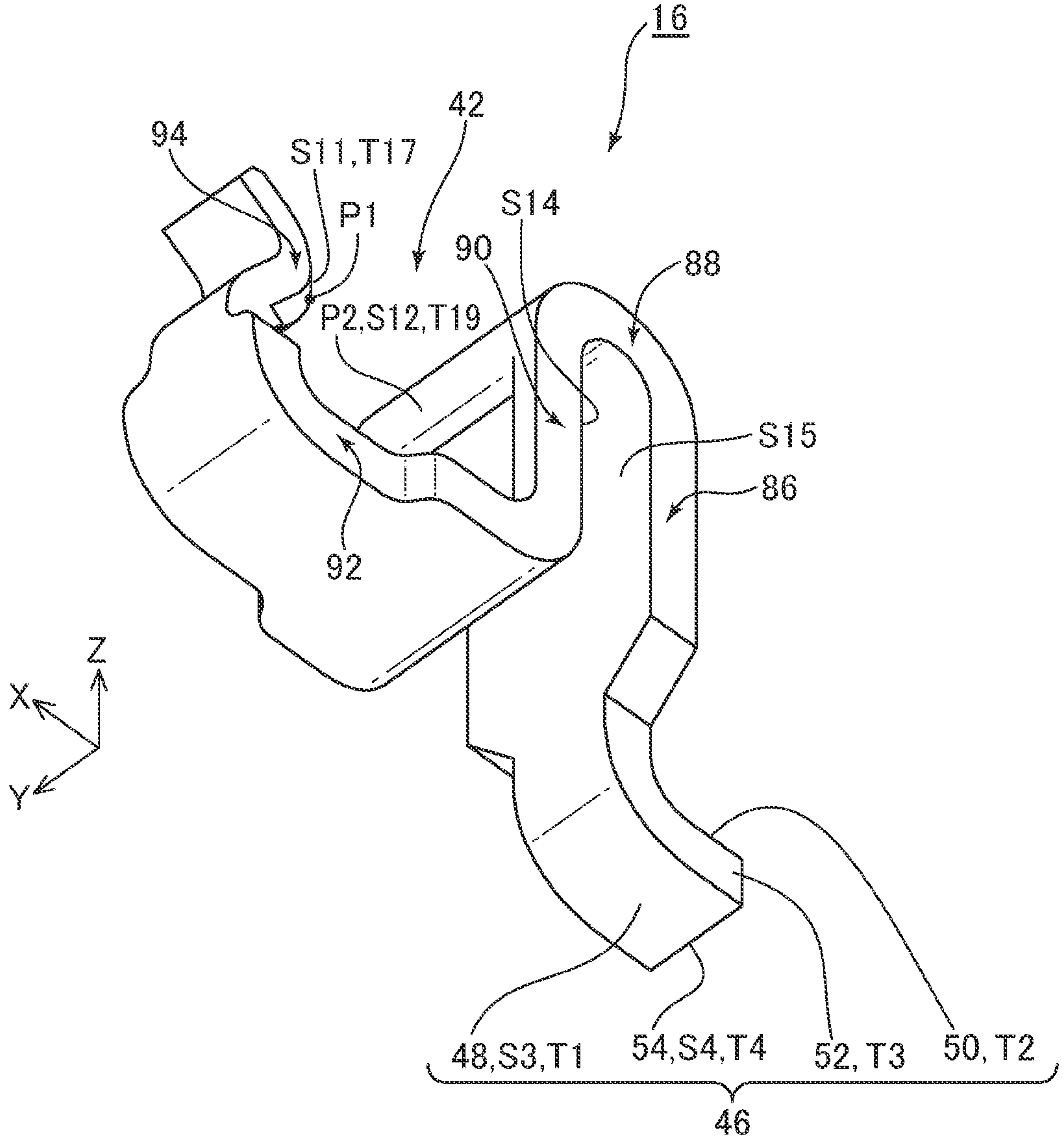
FIG. 7B is a partially enlarged perspective view of the terminal portion of the receptacle connector of the electrical connector according to the first embodiment of the present invention as viewed from a mounted portion side thereof.
Figure 7C:
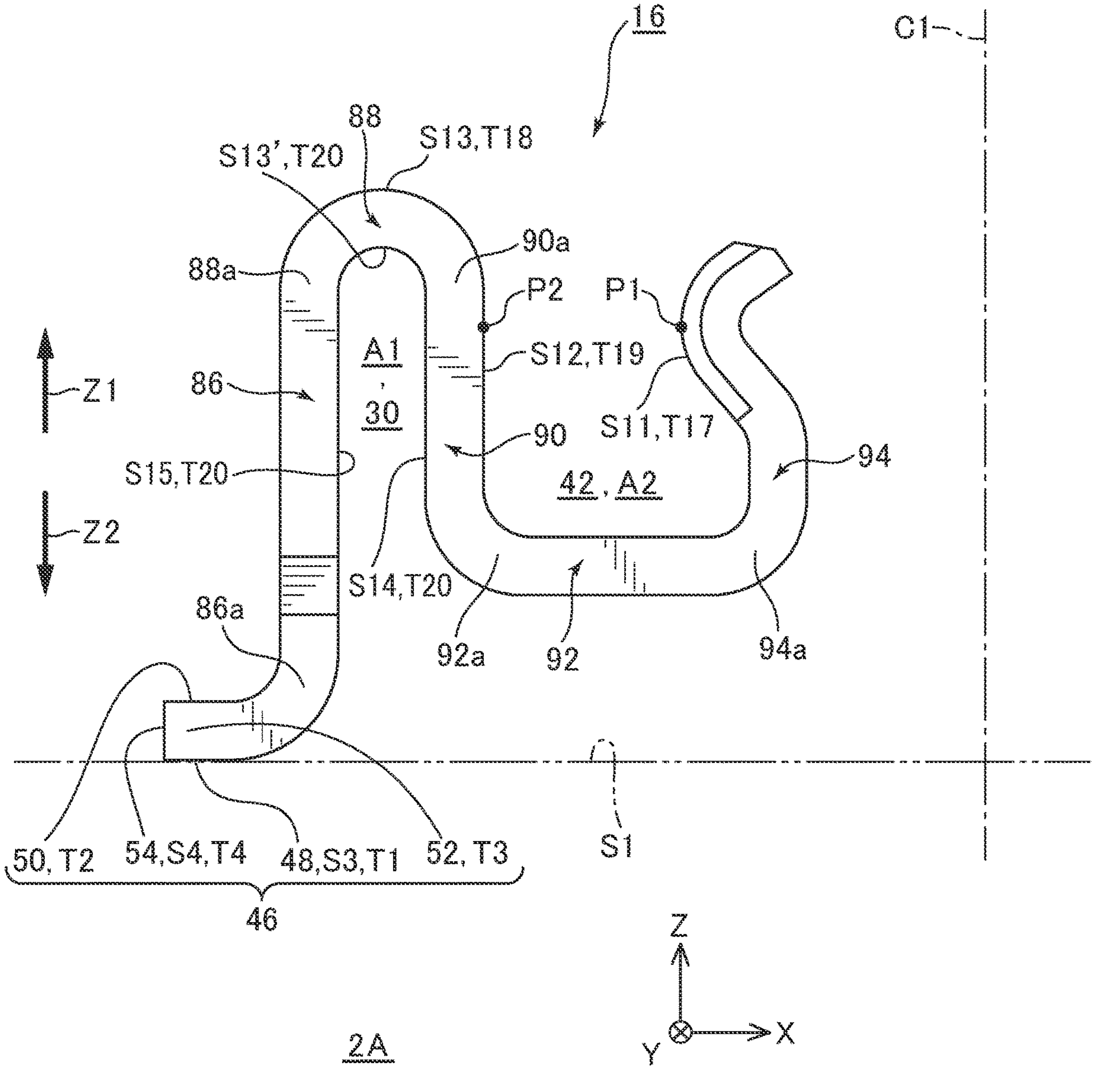
FIG. 7C is a partially enlarged side view of the terminal portion of the receptacle connector of the electrical connector according to the first embodiment of the present invention as viewed from a lengthwise direction (longitudinal direction) of the receptacle connector.

In addition, the second wall 88 bends in a curved U-shape in a side view of FIG. 7C from a connecting part 88*a* with the first wall 86 and makes a U-turn in the fitting release direction Z2 and is connected to the third wall 90.

Furthermore, the third wall 90 extends in the Z direction (fitting release direction Z2) from a connecting part 90*a* with the second wall 88 so as to oppose the first wall 86 in the X direction and is subsequently connected to the fourth wall 92.

Moreover, the fourth wall 92 bends in the X direction toward the central axis C1 of the receptacle connector 4 from a connecting part 92*a* with the third wall 90, extends for a predetermined distance, and is subsequently connected to the fifth wall 94.

In addition, the fifth wall 94 bends in the Z direction (fitting direction Z1) being a first direction which is orthogonal to the first mounting surface S3 from a connecting part 94*a* with the fourth wall 92 and subsequently extends for a predetermined distance. The fifth wall 94 forms a wall surface S11 including a first contact point (main contact point) P1 which is capable of independently and elastically coming into contact with a counterpart terminal (second terminal) 18 and also functions as an elastic contact piece.

In addition, as shown in FIGS. 3 and 7A to 7C, the third wall 90 of the first terminal 16 of the receptacle connector 4 opposes the first wall 86 in the X direction and the longitudinal wall 30 of the peripheral wall 28 of the first housing 8 of the receptacle connector 4 is provided in an inner area A1 which is surrounded by the first wall 86, the second wall 88, and the third wall 90.

Furthermore, the third wall 90 of the first terminal 16 of the receptacle connector 4 also opposes the fifth wall 94 in the X direction and an inner area A2 surrounded by the third wall 90, the fourth wall 92, and the fifth wall 94 acts as a depressed first fitting area A2 which receives the second terminal 18 of the second housing 10 of the plug connector 6 and makes the second terminal 18 contactable when the counterpart-side plug connector 6 is fitted into the receptacle connector 4 and forms the first fitting depression 42.

In other words, the third wall 90 is provided so as to oppose the fifth wall 94 in a second direction (X direction) which is orthogonal to a first direction (fitting direction Z1) and forms a wall surface S12 including a second contact point (sub contact point) P2 which does not come into contact with or which is capable of coming into contact in an auxiliary manner with a counterpart terminal (the second terminal 18).

In the receptacle connector 4 with the plug connector 6 fitted, with the first contact point (main contact point) P1 and the second contact point (sub contact point) P2 of the first terminal 16, the first terminal 16 and the counterpart terminal (second terminal 18) are brought into contact with each other by at least two contact points P1 and P2 (main contact point P1 and sub contact point P2).

Next, as shown in FIGS. 3 and 7A to 7C, the second wall 88 of the first terminal 16 of the receptacle connector 4 is provided at a distal side end (connecting part 88*a*) of the first mounting portion 46 in the first direction (fitting direction Z1) and is spaced apart from the first mounting surface S3 in the first direction (fitting direction Z1) to form an exposed surface S13 which does not come into contact with the first housing 8.

In addition, the wall surface S11 of the fifth wall 94 and the exposed surface S13 of the second wall 88 are to be plated after insert molding. Furthermore, a thickness T17 of a plated portion which has been plated on the wall surface S11 of the fifth wall 94 is set to be greater than a thickness T18 of a plated portion which has been plated on the exposed surface S13 of the second wall 88 (T17>T18).

Note that the thickness T17 is preferably set to 0.05 μm or more and the thickness T18 is preferably set to 0.03 μm or less.

Next, as shown in FIGS. 3 and 7A to 7C, the first thickness T1 of the plated portion which has been plated on the first mounting surface S3 in the first mounting portion 46 of the first terminal 16 is set to be smaller than the thickness T17 of the wall surface S11 of the fifth wall 94 and greater than the thickness T18 of the exposed surface S13 of the second wall 88 (T17>T1>T18).

In addition, the wall surface S12 of the third wall 90 of the first terminal 16 is to be plated after insert molding. A thickness T19 of the plated portion which has been plated on the wall surface S12 of the third wall 90 is set to be equal to or smaller than the thickness T17 of the wall surface S11 of the fifth wall 94 and greater than the thickness T18 of the exposed surface S13 of the second wall 88 (T17≥T19>T18) or equal to or greater than the thickness T17 of the wall surface S11 of the fifth wall 94 (T19≥T17).

When so-called contact by a plurality of contact points (at least two contact points) is performed, in which at least two contact points P1 and P2 of the first terminal 16 including the first contact point (main contact point) P1 on the wall surface S11 of the fifth wall 94 and the second contact point (sub contact point) P2 on the wall surface S12 of the third wall 90 of the first terminal 16 come into contact with a first contact point (main contact point) P3 and a second contact point (sub contact point) P4 of a counterpart-side second terminal 18 described later respectively, the thickness T19 is preferably set to 0.05 μm or less.

On the other hand, when so-called contact by a single contact point (one contact point) is performed, in which only the single contact point P1 being the first contact point (main contact point) P1 on the wall surface S11 of the fifth wall 94 of the first terminal 16 comes into contact with only the first contact point (main contact point) P3 of the counterpart-side second terminal 18 described later, the thickness T19 is preferably set to 0.03 μm or less.

Next, as shown in FIGS. 3 and 7A to 7C, the third wall 90 of the first terminal 16 further includes a wall surface S14 including a contact surface which is provided on an opposite side to the wall surface S12 of the first terminal 16 in the second direction (X direction) that is orthogonal to the first direction (fitting direction Z1) and which comes into contact with a part of the longitudinal wall 30 of the peripheral wall 28 of the first housing 8.

In addition, as shown in FIGS. 3 and 7A to 7C, the first wall 86 of the first terminal 16 further includes a wall surface S15 including a contact surface which opposes the wall surface S14 of the third wall 90 in the X direction and which comes into contact with a part of the longitudinal wall 30 of the peripheral wall 28 of the first housing 8.

In the wall surface S14 of the third wall 90 and the wall surface S15 of the first wall 86 of the first terminal 16, a thickness T20 of a plated portion to be plated after insert molding is set to 0 (T20=0).

Next, as shown in FIGS. 3 and 8A to 8C, the second terminal 18 of the plug connector 6 includes a mounting wall 56 which is the second mounting portion 56 and further includes generally three walls 96, 98, and 100 (a first wall 96, a second wall 98, and a third wall 100) from the mounting wall 56 toward a central axis C2 which extends in the Z direction in the plug connector 6.

In this case, the central axis C2 which extends in the Z direction in the plug connector 6 coincides with the central axis C1 which extends in the Z direction in the receptacle connector 4.

In addition, the first wall 96 bends in the Z direction (fitting direction Z1) from a connecting part 96*a* on a side (opposite side) opposing the fracture surface S6 of the second mounting portion 56 in the X direction, extends for a predetermined distance, and is subsequently connected to the second wall 98.

Furthermore, the second wall 98 bends in the X direction from a connecting part 98*a* with the first wall 96 and extends to a connecting part 100*a* with the third wall 100.

Moreover, the third wall 100 extends in the Z direction (fitting release direction Z2) from the connecting part 100*a* with the second wall 98 so as to oppose the first wall 96 in the X direction.

The first wall 96 forms a wall surface S16 including the first contact point (main contact point) P3 which is capable of independently and elastically coming into contact with the wall surface S11 of the fifth wall 94 of the counterpart terminal (first terminal) 16.

Figure 8A:
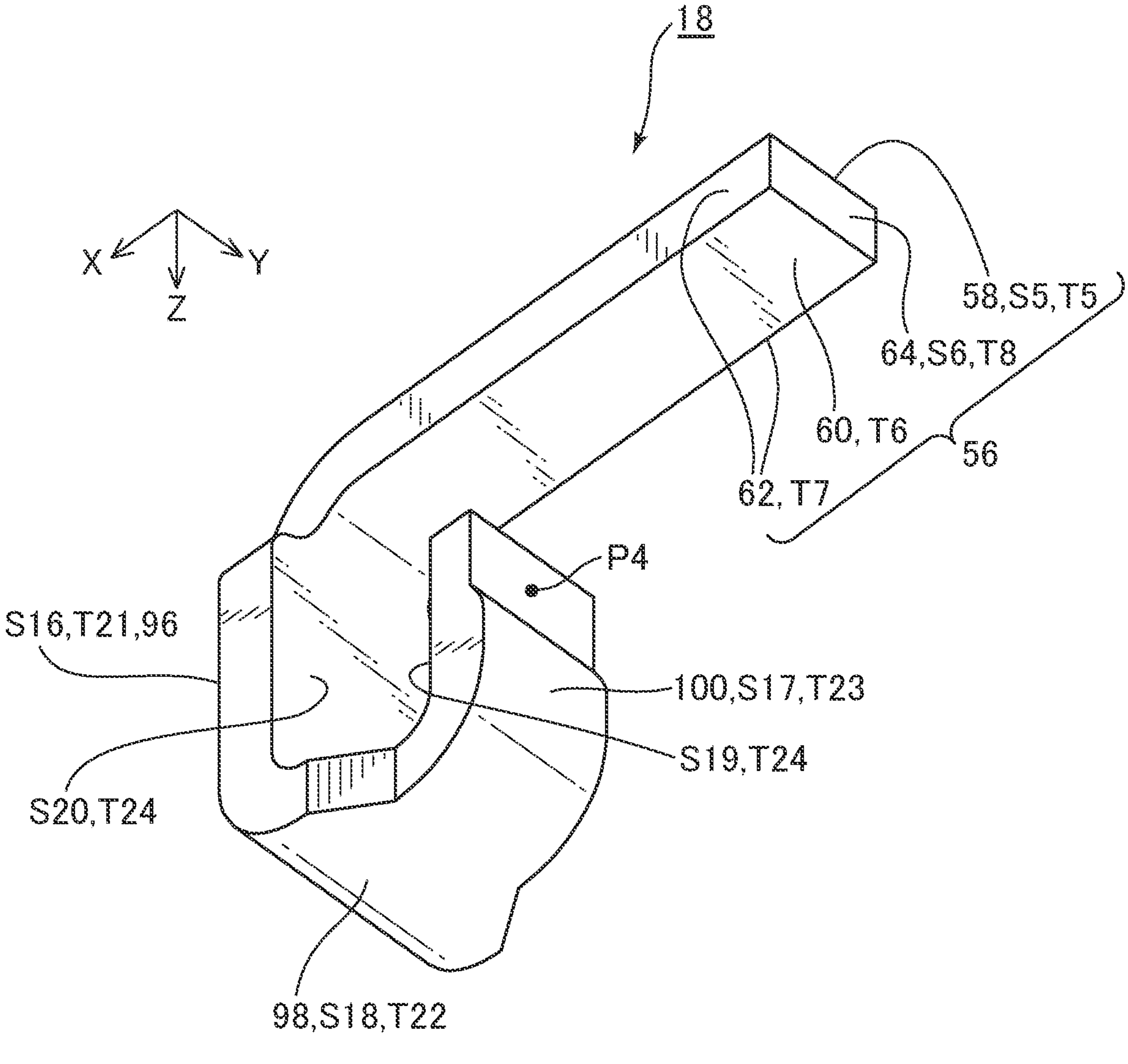
FIG. 8A is a partially enlarged perspective view of a terminal portion of the plug connector of the electrical connector according to the first embodiment of the present invention as viewed from a counterpart connector side thereof (the receptacle connector side)
Figure 8B:
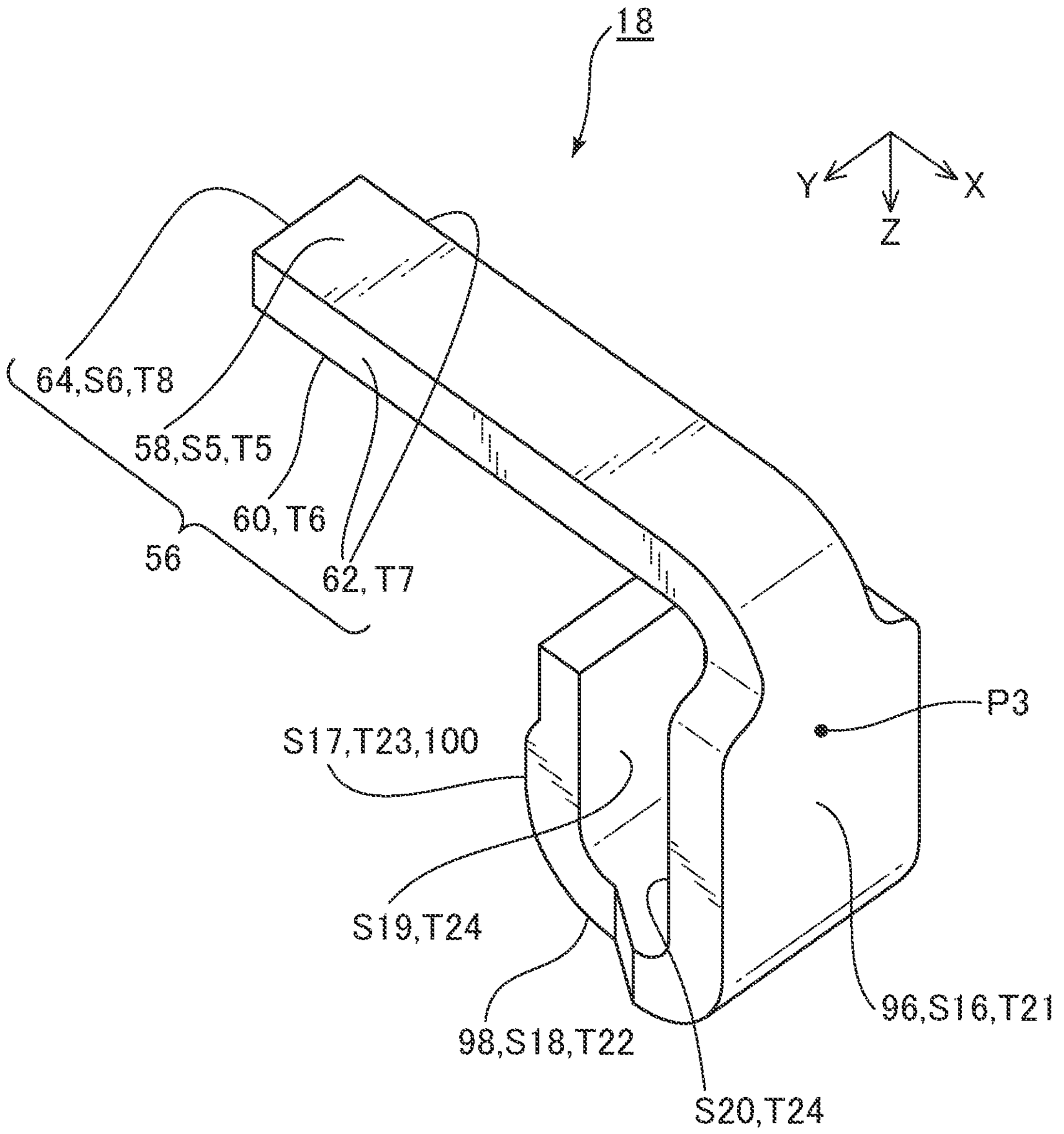
FIG. 8B is a partially enlarged perspective view of the terminal portion of the plug connector of the electrical connector according to the first embodiment of the present invention as viewed from a mounted portion side thereof.
Figure 8C:
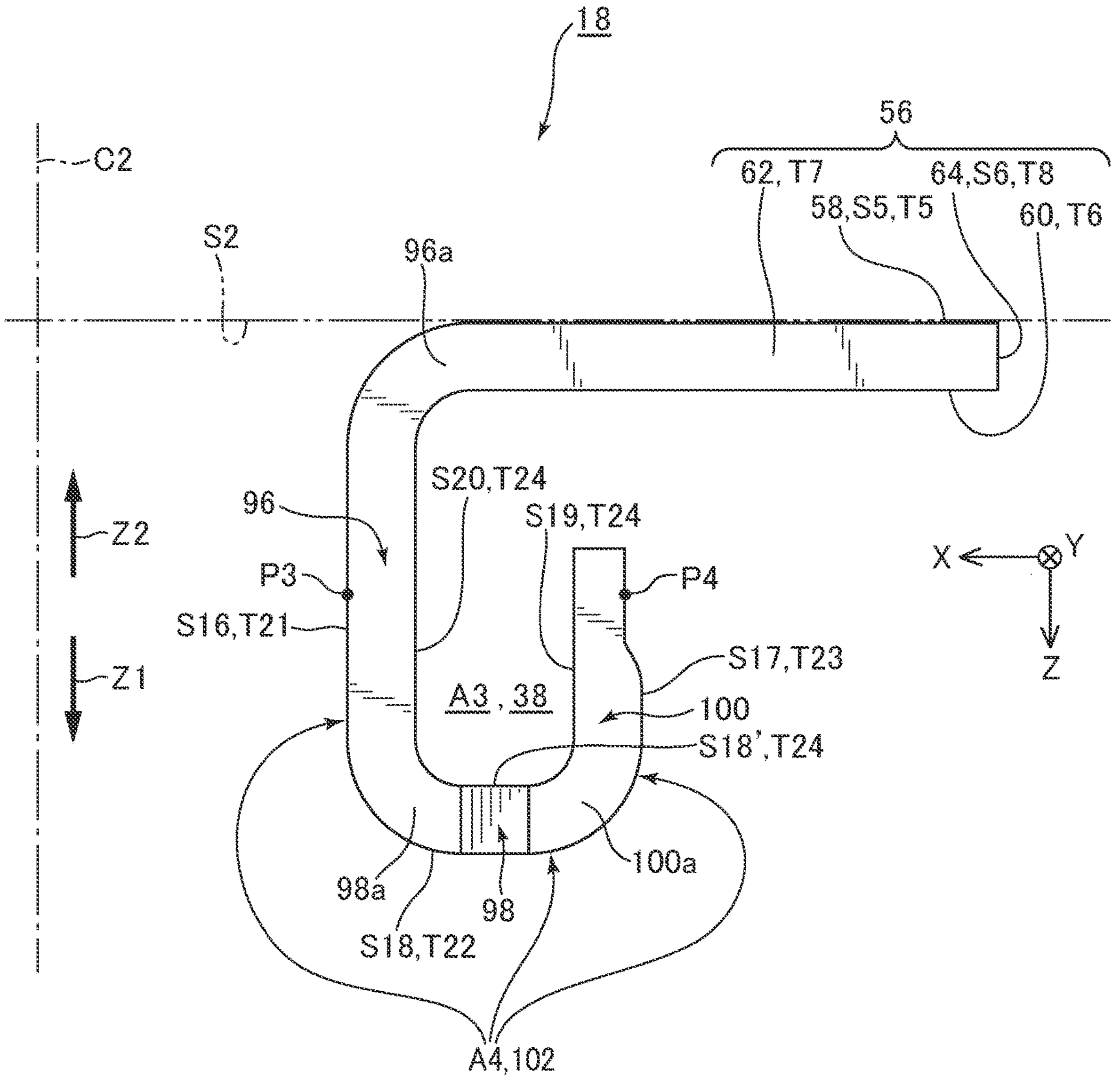
FIG. 8C is a partially enlarged side view of the terminal portion of the plug connector of the electrical connector according to the first embodiment of the present invention as viewed from a lengthwise direction (longitudinal direction) of the plug connector.

In this case, as shown in FIGS. 3 and 8C, in the second terminal 18, the first wall 96 having been bent in the Z direction (fitting direction Z1) from the connecting part 96*a* with the second mounting portion 56 is shaped so as to bend in the X direction after extending to the connecting part 98*a* with the second wall 98 in the Z direction (fitting direction Z1), the second wall 98 is shaped so as to extend to the connecting part 100*a* with the third wall 100 in the X direction and subsequently bend in the Z direction (fitting release direction Z2), and the third wall 100 is shaped so as to extend in the Z direction (fitting release direction Z2). A shape made up of the respective walls 56, 96, 98, and 100 of the second terminal 18 is generally a U-shape or a J-shape which bends and makes a U-turn at each of the connecting parts 98*a* and 100*a* in a side view of FIG. 8C or is a shape (a so-called inner spiral shape) that is wound from inside to outside with respect to the central axis C2 of the plug connector 6.

In addition, as shown in FIGS. 3 and 8A to 8C, the first wall 96 and the third wall 100 of the second terminal 18 of the plug connector 6 oppose each other in the X direction and the longitudinal wall 38 of the peripheral wall 36 of the second housing 10 of the plug connector 6 is provided in an inner area A3 which is surrounded by the first wall 96, the second wall 98, and the third wall 100.

Furthermore, the first wall 96, the second wall 98, and the third wall 100 of the second terminal 18 of the plug connector 6 constitute a fitting area A4 which forms a fitting projection 102 capable of fitting into the first fitting depression 42 of the counterpart-side connector 4 (the receptacle connector 4) when the counterpart-side receptacle connector 4 and the plug connector 6 are fitted to each other.

In other words, the third wall 100 is provided so as to oppose the first wall 96 in a second direction (X direction) which is orthogonal to the first direction (fitting direction Z1) and forms a wall surface S17 including a second contact point (sub contact point) P4 which does not come into contact with or which is capable of coming into contact in an auxiliary manner with the counterpart terminal (the first terminal 16).

Accordingly, when the receptacle connector 4 and the plug connector 6 are fitted to each other in the fitting direction Z1, the fitting projection 102 of the second terminal 18 is to fit inside the first fitting depression 42 of the receptacle connector 4 and the wall 94 of the first terminal 16 is to fit inside the second fitting depression 44 of the second housing 10 of the plug connector 6. In addition, the first contact point (main contact point) P1 and the second contact point (sub contact point) P2 of the first terminal 16 are to come into contact with the first contact point (main contact point) P3 and the second contact point (sub contact point) P4 of the second terminal 18 respectively, and the first terminal 16 and the second terminal 18 are to come into contact with each other by at least two contact points.

Next, as shown in FIGS. 3 and 8A to 8C, the second wall 98 of the second terminal 18 of the plug connector 6 is provided at a distal side end (connecting part 98*a*) of the second mounting portion 56 in the first direction (fitting direction Z1) and is spaced apart from the second mounting surface S5 in the first direction (fitting direction Z1) to form an exposed surface S18 which does not come into contact with the second housing 10.

In addition, the wall surface S16 of the first wall 96 and the exposed surface S18 of the second wall 98 are to be plated after insert molding. Furthermore, a thickness T21 of a plated portion which has been plated on the wall surface S16 of the first wall 96 is set to be greater than a thickness T22 of a plated portion which has been plated on the exposed surface S18 of the second wall 98 (T21>T22).

Note that the thickness T21 is preferably set to 0.05 μm or more and the thickness T22 is preferably set to 0.03 μm or less.

Next, as shown in FIGS. 3 and 8A to 8C, the first thickness T5 of the plated portion which has been plated on the second mounting surface S5 in the second mounting portion 56 of the second terminal 18 is set to be smaller than the thickness T21 of the wall surface S16 of the first wall 96 and greater than the thickness T22 of the exposed surface S18 of the second wall 98 (T21>T5>T22).

In addition, the wall surface S17 of the third wall 100 of the second terminal 18 is to be plated after insert molding. A thickness T23 of the plated portion which has been plated on the wall surface S17 of the third wall 100 is set to be equal to or smaller than the thickness T21 of the wall surface S16 of the first wall 96 and greater than the thickness T22 of the exposed surface S18 of the second wall 98 (T21≥T23≥T22) or equal to or greater than the thickness T21 of the wall surface S16 of the first wall 96 (T23≥T21).

When so-called contact by a plurality of contact points (at least two contact points) is performed, in which at least two contact points P3 and P4 of the second terminal 18 including the first contact point (main contact point) P3 of the wall surface S16 of the first wall 96 and the second contact point (sub contact point) P4 of the wall surface S17 of the third wall 100 of the second terminal 18 come into contact with the first contact point (main contact point) P1 and the second contact point (sub contact point) P2 of the counterpart-side first terminal 16 respectively, the thickness T23 is preferably set to 0.05 μm or less.

On the other hand, when so-called contact by a single contact point (one contact point) is performed, in which only the single contact point P3 being the first contact point (main contact point) P3 on the wall surface S16 of the first wall 96 of the second terminal 18 comes into contact with only the first contact point (main contact point) P1 of the counterpart-side first terminal 16, the thickness T23 is preferably set to 0.03 μm or less.

Next, as shown in FIGS. 3 and 8A to 8C, the third wall 100 of the second terminal 18 further includes a wall surface S19 including a contact surface which is provided on an opposite side to the wall surface S17 of the second terminal 18 in the second direction (X direction) that is orthogonal to the first direction (fitting direction Z1) and which comes into contact with a part of the longitudinal wall 38 of the peripheral wall 36 of the second housing 10.

In addition, as shown in FIGS. 3 and 8A to 8C, the first wall 96 of the second terminal 18 further includes a wall surface S20 including a contact surface which opposes the wall surface S19 of the third wall 100 in the X direction and which comes into contact with a part of the longitudinal wall 38 of the peripheral wall 36 of the second housing 10.

In the wall surface S19 of the third wall 100 and the wall surface S20 of the first wall 96 of the second terminal 18, a thickness T24 of a plated portion to be plated after insert molding is set to 0 (T24=0).

Next, as shown in FIGS. 5A, 5B, 9A, and 9B, the first reinforcement fitting 20 of the first fitting 12 of the receptacle connector 4 includes a mounting wall 66 which is the first mounting portion 66.

In addition, the first reinforcement fitting 20 further includes generally the five walls 86, 88, 90, 92, and 94 (the first wall 86, the second wall 88, the third wall 90, the fourth wall 92, and the fifth wall 94) which come into contact with a part of the longitudinal wall 30 of the first housing 8 and which form a terminal similar to the first terminal 16 shown in FIG. 7A to 7C on a side of the Z1 direction with respect to the mounting wall 66.

The first reinforcement fitting 20 further includes generally four walls 104, 106, 108, and 110 (a first wall 104, a second wall 106, a third wall 108, and a fourth wall 110) which come into contact with a part of the short-side wall 32 of the first housing 8.

First, each of the first walls 86 and 104 of the first reinforcement fitting 20 is provided with the first mounting portion 66 on a side of the Z2 direction and the first walls 86 and 104 are provided so as to bend in the first direction (Z1 direction) which is orthogonal to the first mounting surface S7 of the first mounting portion 66 and to protrude by a predetermined distance.

In addition, each of the first walls 86 and 104 is also formed so as to bend in the X direction and the Y direction respectively at positions of connecting parts 88*a* and 106*a* with the second walls 88 and 106 which are spaced apart from the first mounting portion 66 in the Z1 direction.

Next, the second wall 106 is provided along a predetermined length in the X direction in a central part of the first wall 104 in the X direction and formed so as to protrude in a curved convex shape in the Z1 direction and the Y2 direction from the connecting part 106*a* at one end of the first wall 104 in the Z1 direction. Accordingly, the second wall 106 is provided at a distal side end of the first mounting portion 66 in the first wall 104 in the first direction (Z1 direction).

In addition, in each of the second walls 88 and 106, wall surfaces S13 and S21 on the side of the Z1 direction form exposed surfaces S13 and S21 which are spaced apart from the first mounting surface S7 in the first direction (Z1 direction) and which do not come into contact with the first housing 8.

In addition, each of the first mounting surface S7 of the first mounting portion 66 and the exposed surfaces S13 and S21 of the second walls 88 and 106 of the first reinforcement fitting 20 are to be plated after insert molding.

Furthermore, the first thickness T9 of the plated portion which has been plated on the first mounting surface S7 of the first mounting portion 66 of the first reinforcement fitting 20 is set to be greater than second thicknesses T18 and T25 of plated portions which have been plated on the exposed surfaces S13 and S21 of the second walls 88 and 106 (T9>T18, T25).

Note that the first thickness T9 is preferably set to 0.05 μm or more and less than 0.08 μm and the second thicknesses T18 and T25 are preferably set to 0.03 μm or less.

Next, as shown in FIGS. 7C, 9A, and 9B, each of the third walls 90 and 108 of the first reinforcement fitting 20 is formed so as to extend by a predetermined distance in the Z2 direction from the connecting parts 90*a* and 108*a* at one ends of each of the second walls 88 and 106 in the X direction and the Y direction respectively and is provided so as to oppose each of the first walls 86 and 104 in the X direction and the Y direction respectively.

In addition, the fourth wall 110 of the first reinforcement fitting 20 includes a wall 110*a* which extends by a predetermined distance in the Y1 direction from one end of the first wall 104 in the Z2 direction in a central part in the X direction, a wall 110*b* bends in the Z1 direction and extends by a predetermined distance from one end of the wall 110*a* in the Y1 direction, and a wall 110*c* which is formed so as to protrude in a curved convex shape in the Z1 direction and the Y1 direction from one end of the wall 110*b* in the Z1 direction and which subsequently extends so as to double back in the Z2 direction.

Furthermore, each of the first walls 86 and 104 and the third walls 90 and 108 respectively includes opposing wall surfaces S14 and S15 and opposing wall surfaces S22 and S23, which are provided so as to oppose each other in the X direction and in the Y direction.

Moreover, each of the opposing wall surfaces S14, S15, S22, and S23 of the first walls 86 and 104 and the third walls 90 and 108 as well as each of wall surfaces S13' and S24 on the side of the second walls 88 and 106 in the Z2 direction includes a contact surface which comes into contact with a part of the longitudinal wall 30 and the short-side wall 32 of the peripheral wall 28 of the first housing 8 respectively.

In each of the opposing wall surfaces S14 and S15 and the opposing wall surfaces S22 and S23 of the first walls 86 and 104 and the third walls 90 and 108 as well as each of the wall surfaces S13' and S24 on the side of the second walls 88 and 106 in the Z2 direction, thicknesses T20 and T26 of plated portions to be plated after insert molding are set to 0 (T20, T26=0).

In addition, as shown in FIGS. 5A, 5B, 9A, and 9B, the first reinforcement fitting 20 of the first fitting 12 includes a mounting-side fitting portion 20*a* which includes the first mounting portion 66 and an exposed-side fitting portion 20*b* which includes the second walls 88 and 106.

While each of the reinforcement fittings 20*a* and 20*b* is integrally provided with a common base material in the first reinforcement fitting 20 of the first fitting 12 according to the present embodiment, the reinforcement fittings 20*a* and 20*b* may be separately provided as separate bodies.

Next, as shown in FIGS. 6A, 6B, 10A, and 10B, the second reinforcement fitting 22 of the second fitting 14 of the plug connector 6 includes a mounting wall 76 which is the second mounting portion 76.

In addition, the second reinforcement fitting 22 further includes generally the three walls 96, 98, and 100 (the first wall 96, the second wall 98, and the third wall 100) which come into contact with a part of the longitudinal wall 38 of the second housing 10 and which form a terminal similar to the second terminal 18 shown in FIG. 8A to 8C on a side of the Z1 direction with respect to the mounting wall 76.

The second reinforcement fitting 22 further includes generally four walls 112, 114, 116, and 118 (a first wall 112, a second wall 114, a third wall 116, and a connecting wall 118) which come into contact with a part of the short-side wall 40 of the second housing 10.

First, each of the first walls 96 and 112 of the second reinforcement fitting 22 is provided so as to bend in the first direction (Z1 direction) which is orthogonal to the second mounting surface S9 of the second mounting portion 76 and to extend by a predetermined distance from each of connecting parts 96*a* and 112*a* with the second mounting portion 76 on the side of the Z2 direction.

In addition, the first wall 112 of the second reinforcement fitting 22 is connected by the connecting wall 118 to the first wall 96 of an adjacent second terminal 18.

Next, each of the second walls 98 and 114 of the second reinforcement fitting 22 is formed so as to bend in the X direction and the Y direction respectively from the connecting parts 98*a* and 114*a* at respective ends of each of the first walls 96 and 112 in the Z1 direction and subsequently protrude in a curved convex shape in the Z1 direction and the Y2 direction. Accordingly, each of the second walls 98 and 114 is provided at a distal side end of each of the first walls 96 and 112 in the first direction (Z1 direction) with respect to the second mounting portion 76.

Furthermore, in each of the second walls 98 and 114, wall surfaces S18 and S25 on the side of the Z1 direction form exposed surfaces S18 and S25 which are spaced apart from the second mounting surface S9 in the first direction (Z1 direction) and which do not come into contact with the second housing 10.

In this case, the second mounting surface S9 of the second mounting portion 76 and the exposed surfaces S18 and S25 of the second walls 98 and 114 of the second reinforcement fitting 22 are to be plated after insert molding.

In addition, the first thickness T13 of the plated portion which has been plated on the second mounting surface S9 of the second mounting portion 76 of the second reinforcement fitting 22 is set to be greater than second thicknesses T22 and T27 of plated portions which have been plated on the exposed surfaces S18 and S25 of the second walls 98 and 114 (T13>T22, T27).

Note that the first thickness T13 is preferably set to 0.05 μm or more and less than 0.08 μm and the second thicknesses T22 and T27 are preferably set to 0.03 μm or less.

Next, as shown in FIGS. 8C, 10A, and 10B, each of the third walls 100 and 116 of the second reinforcement fitting 22 is formed so as to extend by a predetermined distance in the Z2 direction from the connecting parts 100*a* and 116*a* at one ends of each of the second walls 98 and 114 in the X direction and the Y2 direction and is provided so as to oppose each of the first walls 96 and 112 in the X direction and the Y direction respectively.

Furthermore, each of the first walls 96 and 112 and the third walls 100 and 116 includes opposing wall surfaces S19, S20, S26, and S27, respectively, provided so as to oppose each other in the X direction and in the Y direction respectively.

Moreover, each of the opposing wall surfaces S19, S20 and S26, S27 of the first walls 96 and 112 and the third walls 100 and 116 as well as each of wall surfaces S18' and S28 of the second walls 98 and 114 on the side of the Z2 direction includes a contact surface which comes into contact with a part of the longitudinal wall 38 and the short-side wall 40 of the peripheral wall 36 of the second housing 10 respectively.

In each of the opposing wall surfaces S19, S20 and S26, S27 of the first walls 96 and 112 and the third walls 100 and 116 as well as each of the wall surfaces S18' and S28 of the second walls 98 and 114 on the side of the Z2 direction, thicknesses T24 and T28 of plated portions to be plated after insert molding are set to 0 (T24, T28=0).

In addition, as shown in FIGS. 6A, 6B, 10A, and 10B, the second reinforcement fitting 22 of the second fitting 14 includes a mounting-side fitting portion 22*a* which includes the second mounting portion 76 and an exposed-side fitting portion 22*b* which includes the second walls 98 and 114.

While each of the reinforcement fittings 22*a* and 22*b* is integrally provided with a common base material in the second reinforcement fitting 22 of the second fitting 14 according to the present embodiment, the reinforcement fittings 22*a* and 20*b* may be separately provided as separate bodies.

Each of the reinforcement fittings 20 and 22 of each of the fittings 12 and 14 in each of the connectors 4 and 6 of the electrical connector 1 according to the present embodiment described above is not limited to having a feature of reinforcing each of the housings 8 and 10 which respectively correspond to the reinforcement fittings 20 and 22 and may be a shield fitting which shields a part of each of the connectors 4 and 6.

Alternatively, each of the reinforcement fittings 20 and 22 of each of the fittings 12 and 14 may have a feature of locking (engaging) the reinforcement fittings 20 and 22 to each other when the connector 4 is fitted to the counterpart-side connector 6 or may function as a power supply terminal which comes into contact with and electrically conducts the counterpart-side reinforcement fittings 20 and 22.

In addition, as a plate material to be used in the partial plating for each of the mounting portions 46, 56, 66, and 76 of each of the fittings 12 and 14 of the electrical connector 1 according to the present embodiment described above, a material with relatively high conductivity or solder wettability is particularly preferably adopted. Specifically, a precious metal such as gold (Au), silver (Ag), platinum (Pt), and palladium (Pd) is preferably adopted and, as a minimum, partial plating by so-called "gold plating" by adopting gold (Au) is preferably performed.

The gold to be adopted as a plate material is not limited to pure gold (100% Au) and may be a material containing Au as a principal component and small amounts of other metals.

Furthermore, the first thicknesses T1, T5, T9, and T13, the second thicknesses T2, T6, T10, and T14, the third thicknesses T3, T7, T1, and T15, and the fourth thicknesses T4, T8, T12, and T16 of the plated portions of each of the first surfaces 48, 58, 68, and 78, the second surfaces 50, 60, 70, and 80, the third surfaces 52, 62, 72, and 82, and the fourth surfaces 54, 64, 74, and 84 of each of the mounting portions 46, 56, 66, and 76 of each of the fittings 12 and 14 can be measured by X-ray florescence (XRF) analysis or scanning electron microscopy (SEM) which are well-known techniques.

In addition, while portions of the fittings 12 and 14 which come into close contact with resins of the housings 8 and 10 are made of bare metal (copper alloy), nickel (Ni) may be applied as base plating.

Furthermore, the method of performing partial plating for each of the fittings 12 and 14 which is held by each of the housings 8 and 10 after being integrally molded with each of the housings 8 and 10 by insert molding is a well-known technique as described in, for example, Japanese Patent Laid-Open No. 2013-213248.

In simple terms, a thin plate-shaped base material of each of the fittings 12 and 14 having been integrally molded with each of the housings 8 and 10 by insert molding is wound around an outer circumferential surface of a cylindrical support body drum which contains a plating solution. In addition, when the support body drum rotates, the thin plate-shaped base material of each of the fittings 12 and 14 is fed and, at the same time, the predetermined plating area of each of the fittings 12 and 14 are plated with the plating solution being jetted from plating holes on the outer circumferential surface of the support body drum opposing the predetermined plating area of each of the fittings 12 and 14.

Next, an advantageous effect of the electrical connector 1 according to the first embodiment of the present invention will be described with reference to FIGS. 1 to 10B.

With the electrical connector 1 according to the present embodiment described above, each of the fittings 12 and 14 is integrally molded with the housings 8 and 10 by insert molding and, after each of the fittings 12 and 14 is integrally held by each of the housings 8 and 10, plating is partially performed on surfaces of the fittings 12 and 14.

Accordingly, manufacturing efficiency can be improved as compared to a case of adopting a step where, for example, after plating is performed in advance on the fittings, each of the plated fittings 12 and 14 is press-fitted into each of the housings 8 and 10 when the electrical connector 1 is being manufactured.

In addition, since plating is only partially performed on a part of a surface of each of the fittings 12 and 14 which require plating and there is no need to perform plating on the entire surface of each of the fittings 12 and 14, manufacturing costs related to plating or the like can be reduced.

In particular, even when an expensive plate with relatively high conductivity or an expensive plate with relatively high solder wettability is adopted as the plate to be used in plating, since a portion where the plating is to be performed is limited to a part of the surface of each of the fittings 12 and 14, manufacturing costs can be reduced effectively.

Furthermore, when plating is partially performed on the surface of each of the fittings 12 and 14, plating is performed on at least the wall surface S11 which includes the first contact point (main contact point) P1 capable of coming into contact with the counterpart-side second terminal 18 in the wall 94 of the first terminal 16 and the wall surface S16 which includes the first contact point (main contact point) P3 capable of coming into contact with the counterpart-side first terminal 16 in the wall 96 of the second terminal 18.

In addition, plating is performed on the exposed surface S13 which does not come into contact with the first housing 8 in the wall 88 of the first terminal 16 and on the exposed surface S18 which does not come into contact with the second housing 10 in the wall 98 of the second terminal 18.

At this point, the wall 94 of the first terminal 16 functions as an elastic contact piece including the first contact point (main contact point) P1 capable of elastically coming into contact with the counterpart-side second terminal 18 and the thickness T17 of the plated portion which has been plated on the wall surface S11 of the wall 94 is set to be greater than the thickness T18 of a plated portion which has been plated on the exposed surface S13 of the wall 88 of the terminal 16 (T17>T18).

Accordingly, electrical resistance of the wall surface S11 of the wall 94 of the first terminal 16 which includes the first contact point (main contact point) P1 that independently comes into contact with the counterpart-side second terminal 18 can be reduced and conductivity can be improved.

In a similar manner, the thickness T21 of the plated portion which has been plated on the wall surface S16 of the wall 96 of the second terminal 18 including the first contact point (main contact point) P3 capable of elastically coming into contact with the counterpart-side first terminal 16 is set greater than the thickness T22 of the plated portion which has been plated on the exposed surface S18 of the wall 98 of the second terminal 18 (T21>T22).

Accordingly, electrical resistance of the wall surface S16 of the wall 96 of the second terminal 18 which includes the first contact point (main contact point) P3 that independently comes into contact with the counterpart-side first terminal 16 can be reduced and conductivity can be improved.

On the other hand, the plating thicknesses (thicknesses T18 and T22) on the exposed surfaces S13 and S18 of the walls 88 and 98 of the terminals 16 and 18 which do not come into contact with each of the housings 8 and 10 and which hardly contribute to conductivity to the counterpart terminals 16 and 18 as compared to the walls 94 and 96 of each of the terminals 16 and 18 can be reduced and manufacturing costs related to plating and the like can be reduced.

As a result, manufacturing costs can be reduced while improving electrical characteristics of the electrical connector 1 by performing partial plating for each part of the terminals 16 and 18 of each of the fittings 12 and 14 to be integrally molded with and held by each of the housings 8 and 10 by weighting plating thickness in accordance with an application of the part.

Furthermore, with the electrical connector 1 according to the present embodiment, the thicknesses T1 and T5 of the plated portions having been plated on the mounting surfaces S3 and S5 of the mounting portions 46 and 56 of each of the terminals 16 and 18 are set smaller than the thicknesses T17 and T21 of the plated portions on the wall surfaces S11 and S16 of the walls 94 and 96 of each of the terminals 16 and 18 and greater than the thicknesses T18 and T22 of the plated portions on the exposed surfaces S13 and S18 of the walls 88 and 98 of each of the terminals 16 and 18 (T17>T1>T18 and T21>T5>T22).

Accordingly, solder wettability of the plated portions with the thicknesses T1 and T5 on the mounting surfaces S3 and S5 in the mounting portions 46 and 56 of each of the terminals 16 and 18 can be made favorable.

Therefore, the mounting portions 46 and 56 of the terminals 16 and 18 of each of the fittings 12 and 14 held by the each of the housings 8 and 10 of the electrical connector 1 can be securely fixed to the mounted portions 2A and 2B of the mounted object 2 and the electrical connector 1 can be reliably mounted to the mounted object 2.

In addition, by setting the thicknesses T17 and T21 of the plated portions on the wall surfaces S11 and S16 in the walls 94 and 96 of each of the terminals 16 and 18 greater than the thicknesses T1 and T5 of the plated portions having been plated on the mounting surfaces S3 and S5 of the mounting portions 46 and 56 of each of the terminals 16 and 18, electrical resistance of the wall surfaces S11 and S16 of the walls 94 and 96 of each of the terminals 16 and 18 can be reduced and conductivity can be improved.

Furthermore, by making the plating thicknesses (thicknesses T18 and T22) on the exposed surfaces S13 and S18 in the walls 88 and 98 of each of the terminals 16 and 18 smaller than the thicknesses T1 and T5 of the plated portions having been plated on the mounting surfaces S3 and S5 of the mounting portions 46 and 56 of each of the terminals 16 and 18, the plating thicknesses (thicknesses T18 and T22) on the exposed surfaces S13 and S18 in the walls 88 and 98 of each of the terminals 16 and 18 can be reduced and manufacturing costs related to plating and the like can be reduced.

Furthermore, with the electrical connector 1 according to the present embodiment, the thicknesses T19 and T23 of the plated portions having been plated on the wall surfaces S12 and S17 of the walls 90 and 100 of each of the terminals 16 and 18 including the second contact points (sub contact points) P2 and P4 which do not come into contact or which are capable of coming into contact in an auxiliary manner with the counterpart terminals 16 and 18 are equal to or smaller than the thicknesses T17 and T21 of the plated portions on the wall surfaces S11 and S16 of the walls 94 and 96 of each of the terminals 16 and 18 and greater than the plating thicknesses (thicknesses T18 and T22) on the exposed surfaces S13 and S18 of the walls 88 and 98 of each of the terminals 16 and 18 ($T17 \geq T19 > T18$ and $T21 \geq T23 > T22$). Alternatively, the thicknesses T19 and T23 are equal to or greater than the thicknesses T17 and T21 ($T19 \geq T17$ and $T23 \geq T21$).

Accordingly, while reducing electrical resistance of the wall surfaces S11 and S16 including the first contact points (main contact points) P1 and P3 of the walls 94 and 96 of each of the terminals 16 and 18 and improving conductivity, electrical resistance can also be reduced and conductivity can also be improved with respect to the wall surfaces S12 and S17 of the walls 90 and 100 of the terminals 16 and 18 including the second contact points (sub contact points) P2 and P4 which do not come into contact with or which are capable of coming into contact in an auxiliary manner in accordance with the counterpart terminals 16 and 18.

In addition, by making the plating thicknesses (thicknesses T18 and T22) on the exposed surfaces S13 and S18 in the walls 88 and 98 of each of the terminals 16 and 18 smaller than the thicknesses T17 and T21 of the plated portions having been plated on the wall surfaces S11 and S16 of the walls 94 and 96 of the terminals 16 and 18 and the thicknesses T19 and T23 of the plated portions having been plated on the wall surfaces S12 and S17 in the walls 90 and 100 ($T17 \geq T19 > T18$ and $T21 \geq T2322\ T22$), manufacturing costs related to plating and the like can be reduced.

Furthermore, with the electrical connector 1 according to the present embodiment, since consideration need not be given to conductivity and solder wettability with respect to the wall surfaces S14, S15, S19, and S20 of the walls 86 and 90 of each of the terminals 16 and 18 which only function as contact surfaces that come into contact with a part of each of the housings 8 and 10, the thicknesses T20 and T24 of the plated portion to be plated are set to 0 ($T20 = T24 = 0$).

Accordingly, plating can be omitted and manufacturing costs can be reduced.

Next, with the electrical connector 1 according to the present embodiment, partial plating by, as a minimum, so-called "gold plating" in which gold (Au) is adopted is performed for each of the plurality of terminals 16 and 18 of each of the fittings 12 and 14.

With such gold plating, conductivity and durability in each of the terminals 16 and 18 of each of the fittings 12 and 14 can be maintained.

In addition, limiting plating that adopts relatively expensive gold plating to partial locations can reduce manufacturing costs.

In addition, with the electrical connector 1 according to the present embodiment, partial plating is performed for each of the plurality of terminals 16 of the fitting 12 of the receptacle connector 4.

Accordingly, in the receptacle connector 4, manufacturing costs can be reduced while maintaining conductivity and durability in each of the terminals 16 of the fitting 12.

Furthermore, with the electrical connector 1 according to the present embodiment, partial plating is performed for each of the plurality of terminals 18 of the fitting 14 of the plug connector 6.

Accordingly, in the plug connector 6, manufacturing costs can be reduced while maintaining conductivity and durability of each of the terminals 18 of the fitting 14.

Next, an electrical connector 200 according to a second embodiment of the present invention will be described with reference to FIGS. 11 to 13C.

In the electrical connector 200 according to the present embodiment shown in FIGS. 11 to 13C, same portions as the electrical connector 1 according to the first embodiment of the present invention described above will be denoted by same reference signs and descriptions thereof will be omitted.

Figure 11:
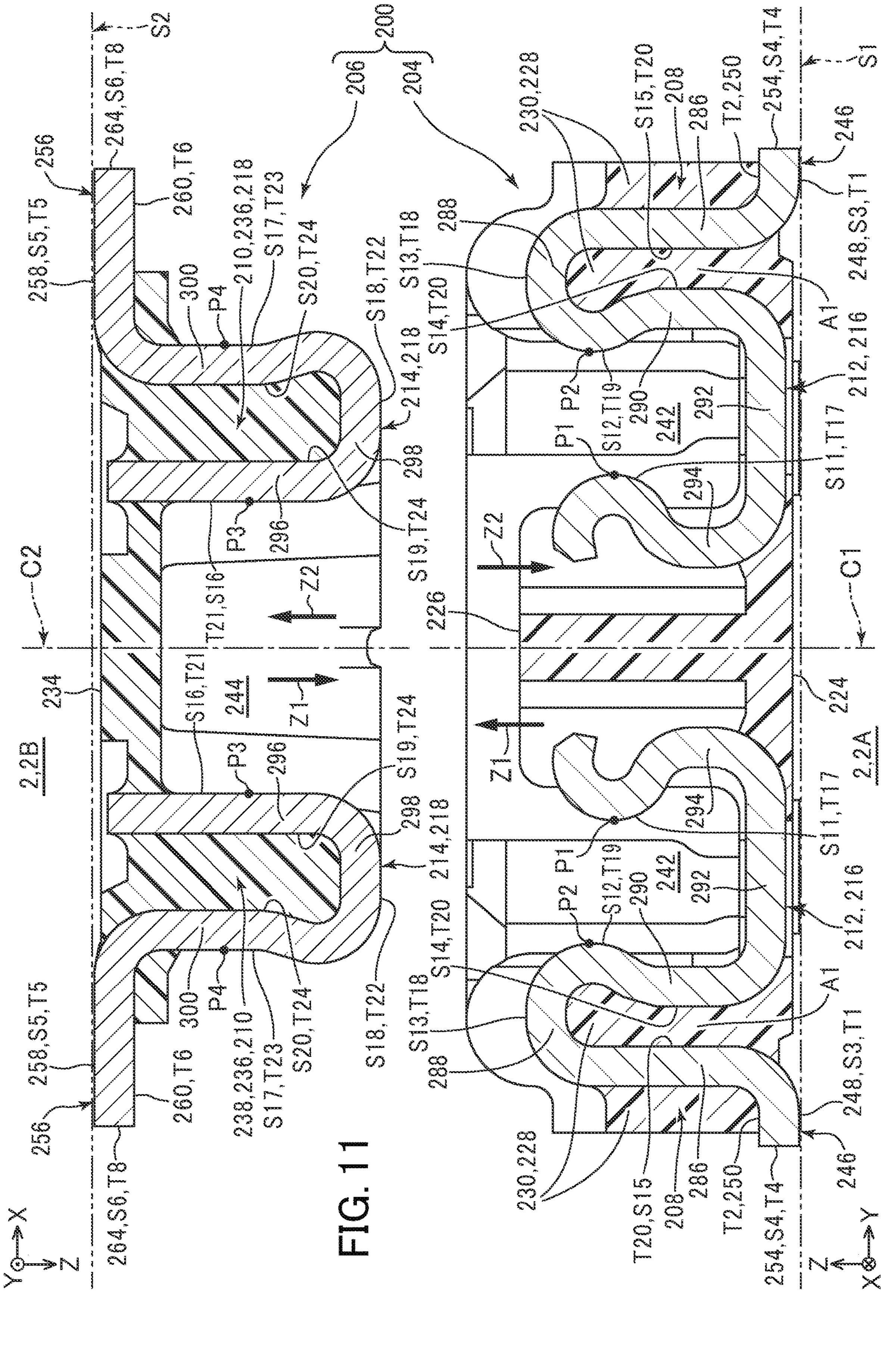
FIG. 11 is a similar sectional view of an electrical connector according to a second embodiment of the present invention.
Figure 12A:
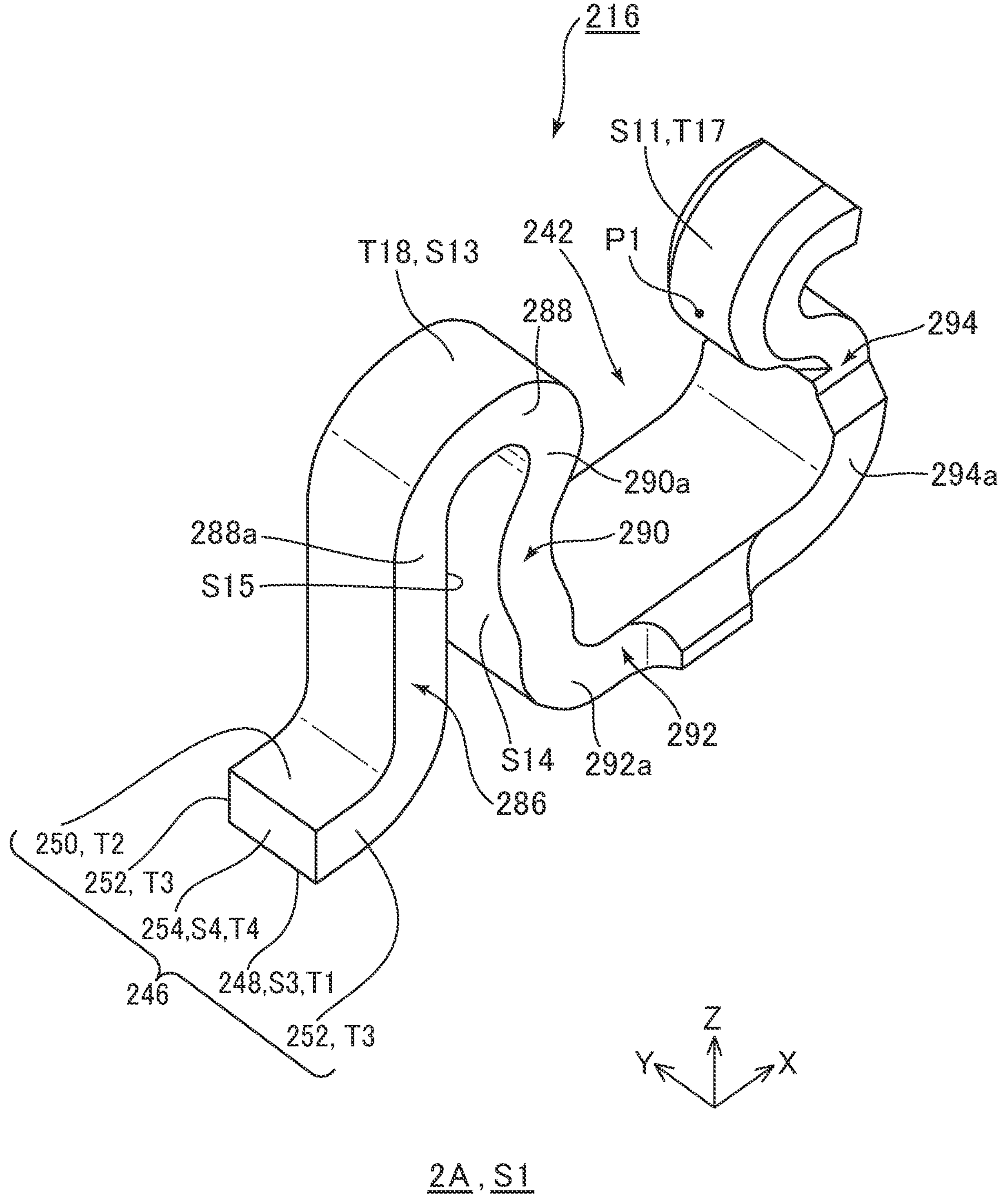
FIG. 12A is a partially enlarged perspective view of a terminal portion of a receptacle connector of the electrical connector according to the second embodiment of the present invention as viewed from a counterpart connector side thereof (the plug connector side)
Figure 12B:
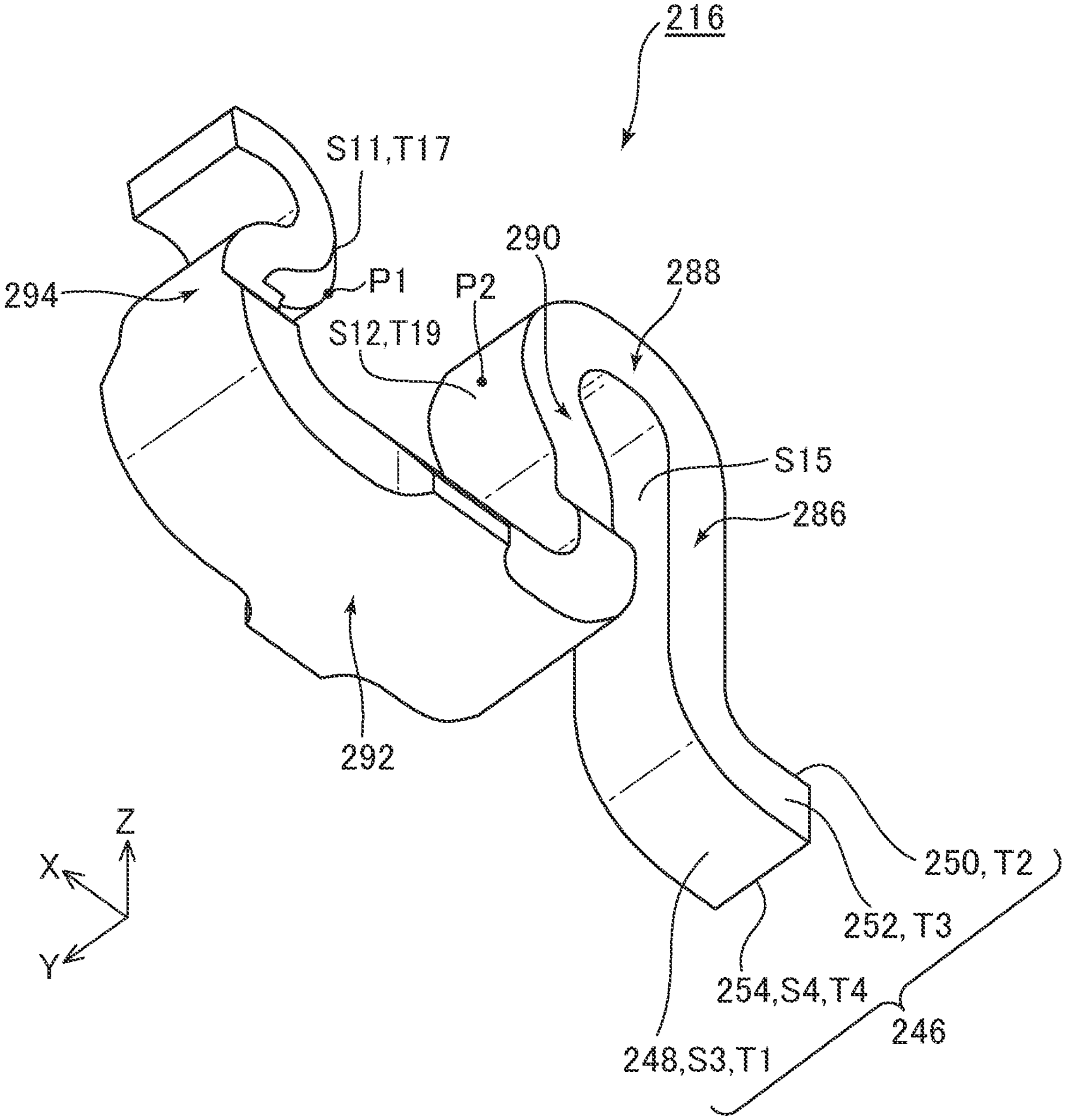
FIG. 12B is a partially enlarged perspective view of the terminal portion of the receptacle connector of the electrical connector according to the second embodiment of the present invention as viewed from a mounted portion side thereof.
Figure 12C:
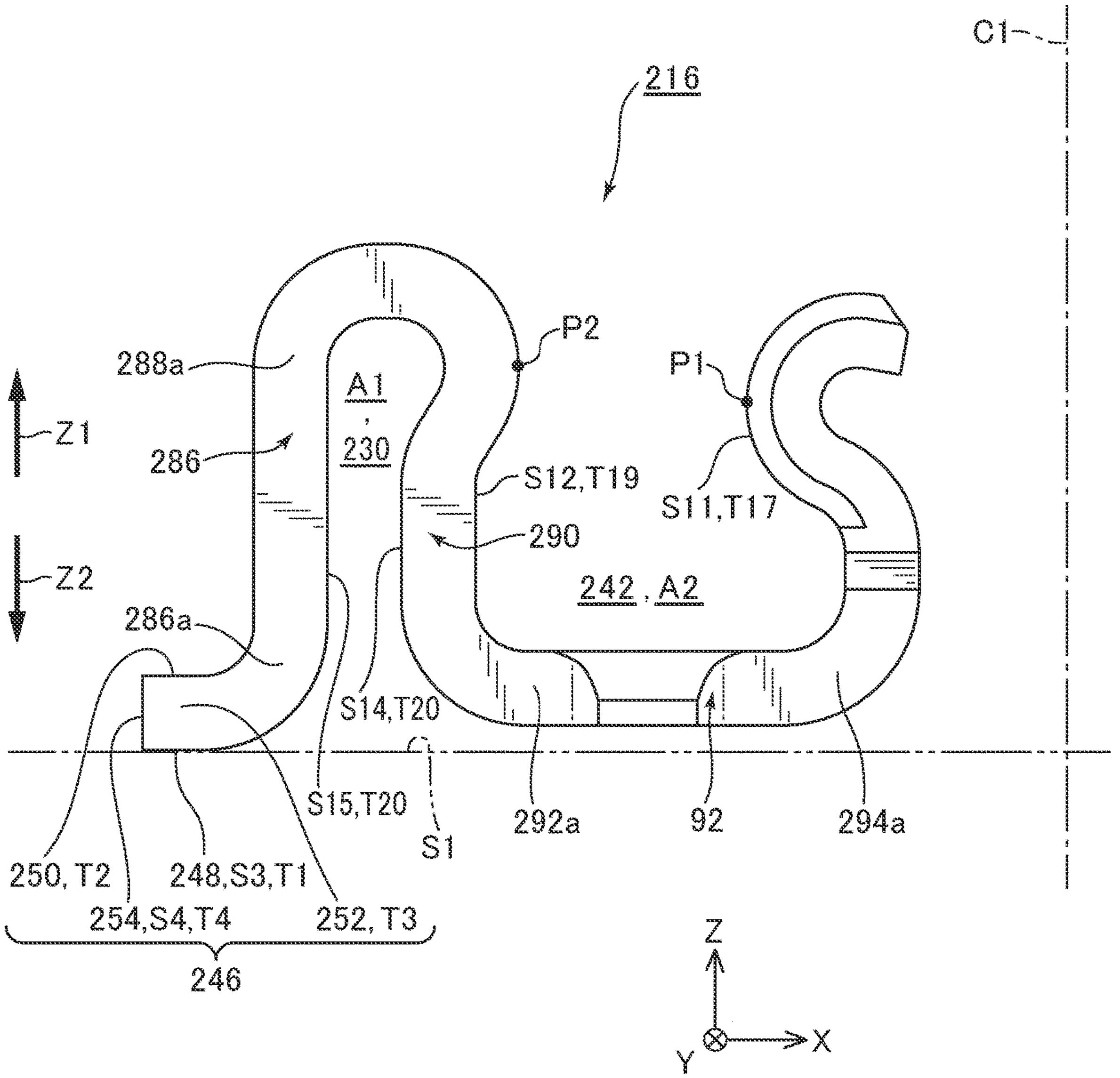
FIG. 12C is a partially enlarged side view of the terminal portion of the receptacle connector of the electrical connector according to the second embodiment of the present invention as viewed from a lengthwise direction (longitudinal direction) of the receptacle connector.
Figure 13A:
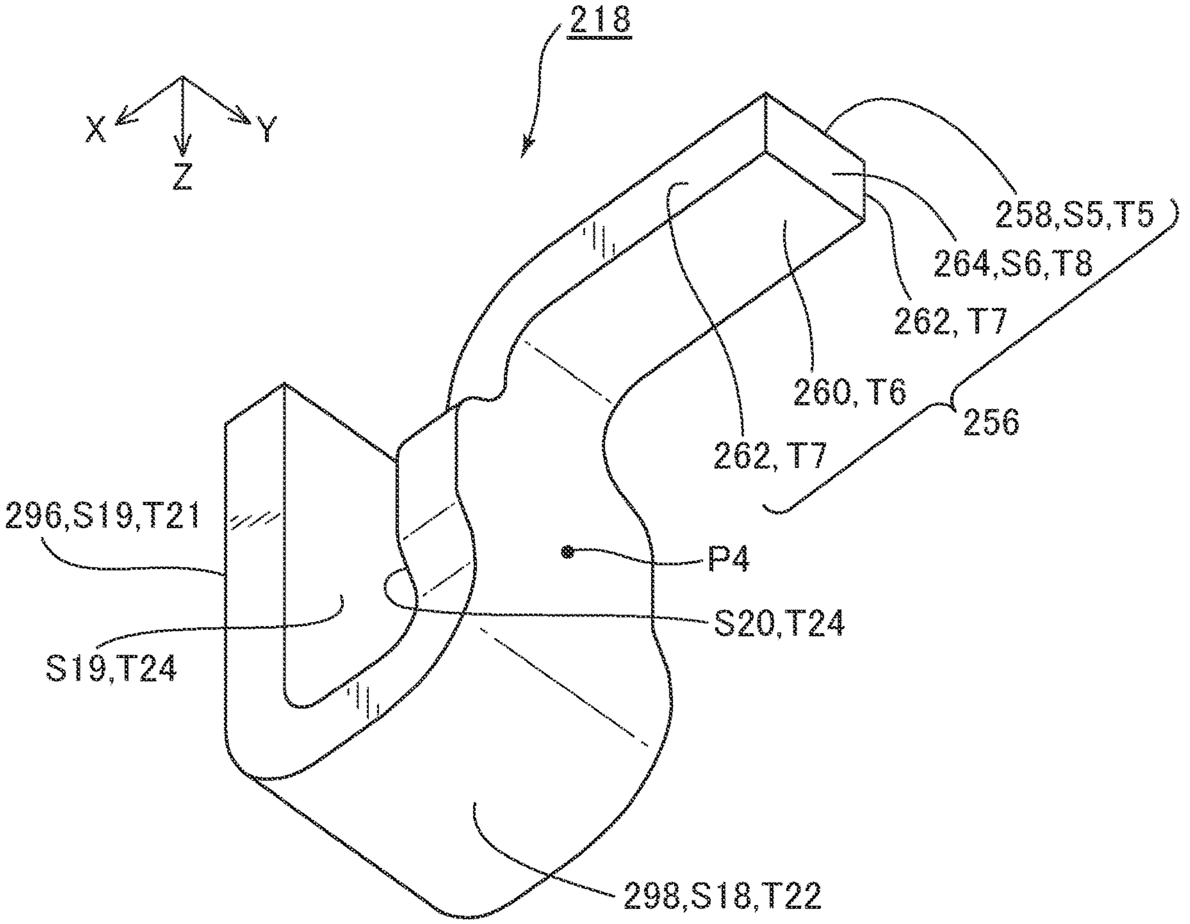
FIG. 13A is a partially enlarged perspective view of a terminal portion of the plug connector of the electrical connector according to the second embodiment of the present invention as viewed from a counterpart connector side thereof (the receptacle connector side)
Figure 13B:
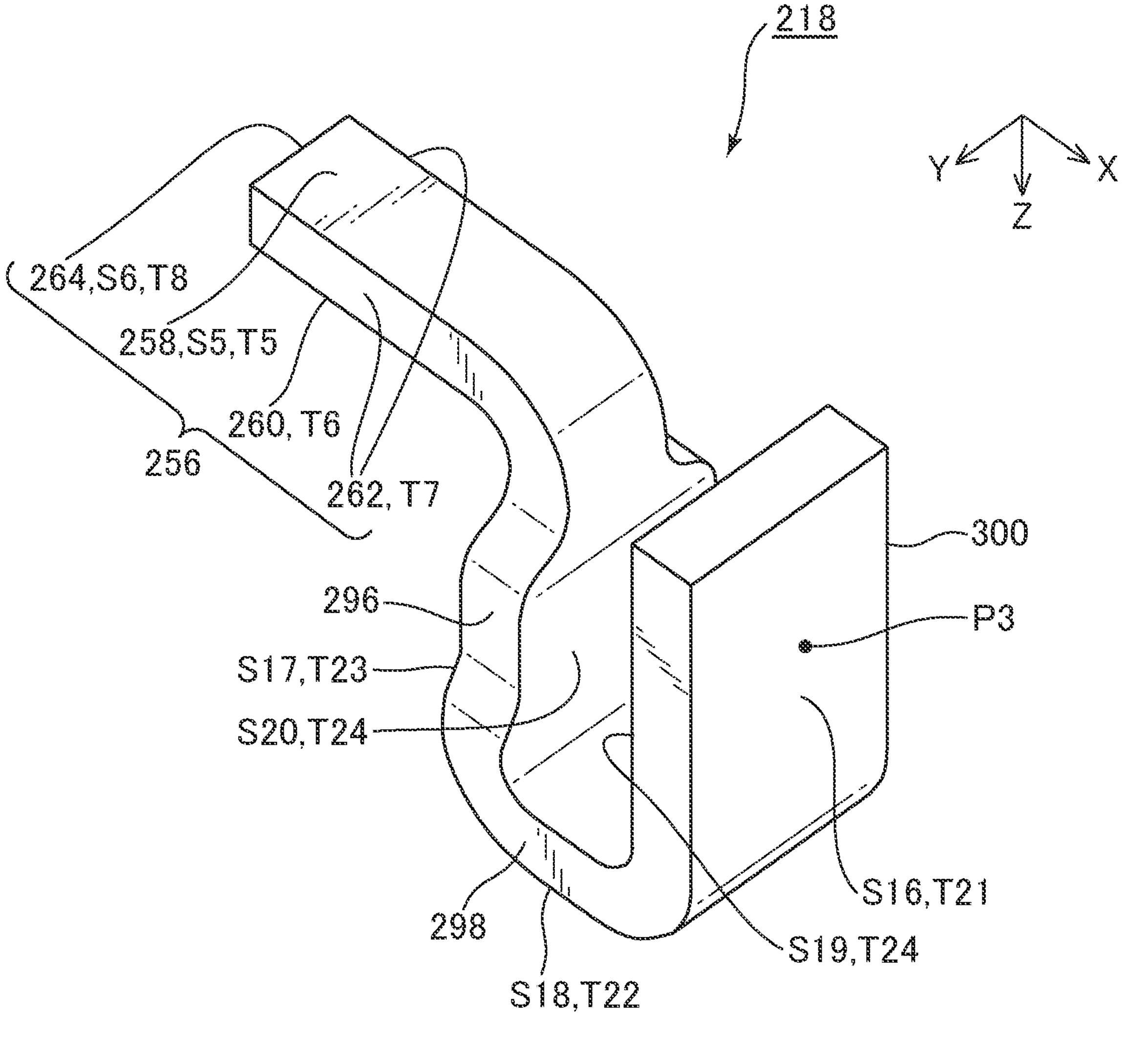
FIG. 13B is a partially enlarged perspective view of the terminal portion of the plug connector of the electrical connector according to the second embodiment of the present invention as viewed from a mounted portion side thereof.
Figure 13C:
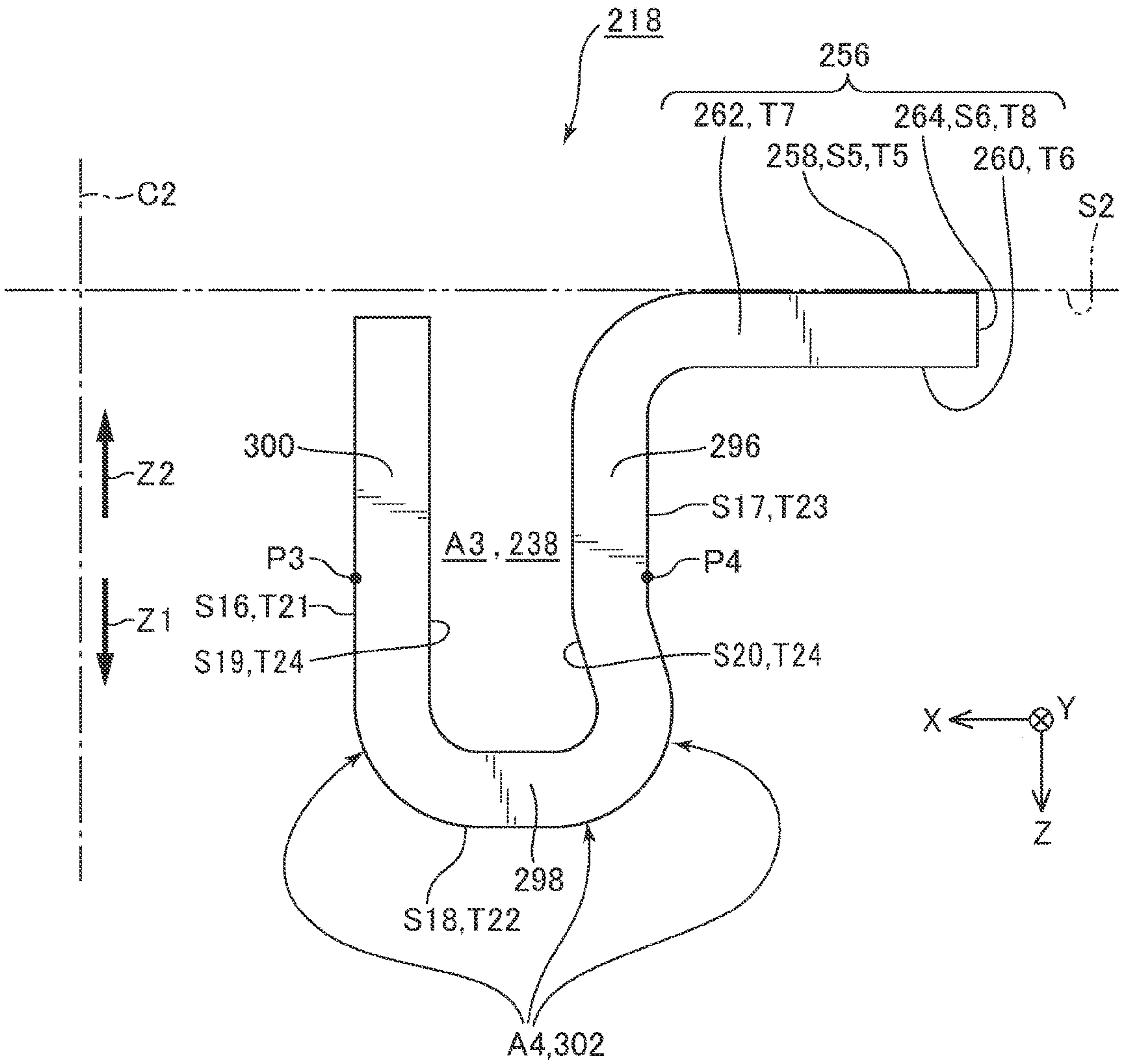
FIG. 13C is a partially enlarged side view of the terminal portion of the plug connector of the electrical connector according to the second embodiment of the present invention as viewed from a lengthwise direction (longitudinal direction) of the plug connector.

First, as shown in FIG. 11, in the electrical connector 200 according to the present embodiment, a first terminal 216 of a first fitting 212 of a receptacle connector 204 has a similar form to the first terminal 16 of the first fitting 12 of the receptacle connector 4 of the electrical connector 1 according to the first embodiment of the present invention described above.

On the other hand, a second terminal 218 of a second fitting 214 of a plug connector 206 has a shape (a so-called outer spiral shape) of being wound from outside to inside with respect to the central axis C2 of the plug connector 206 which differs from the shape (a so-called inner spiral shape) of being wound from inside to outside with respect to the central axis C2 of the plug connector 6 in the second terminal 18 of the plug connector 6 of the electrical connector 1 according to the first embodiment of the present invention described above.

In addition, when the receptacle connector 204 and the plug connector 206 are fitted to each other in the fitting direction Z1, the fitting projection 302 of the second terminal 218 is to fit inside the first fitting depression 242 of the receptacle connector 204 and, at the same time, a wall 294 of the first terminal 216 is to fit inside the second fitting depression 244 of the second housing 210 of the plug connector 206. Furthermore, the first contact point (main contact point) P1 and the second contact point (sub contact point) P2 of the first terminal 216 are to come into contact with the first contact point (main contact point) P3 and the second contact point (sub contact point) P4 of the second terminal 218 respectively, and the first terminal 216 and the second terminal 218 are to come into contact with each other by at least two contact points.

As shown in FIGS. 11 to 13C, with the electrical connector 200 according to the present embodiment, each of the fittings 212 and 214 is integrally molded with the housings 208 and 210 by insert molding and, after each of the fittings 212 and 214 is integrally held by each of the housings 208 and 210, plating is partially performed on surfaces of the fittings 212 and 214.

Accordingly, manufacturing efficiency can be improved as compared to a case of adopting a step where, for example, after plating is performed in advance on the fittings, each of the fittings 212 and 214 having been plated is press-fitted into each of the housings 208 and 210 when the electrical connector 200 is being manufactured.

In addition, since plating is only partially performed on a part of a surface of each of the fittings 212 and 214 which requires plating and there is no need to perform plating on the entire surface of each of the fittings 212 and 214, manufacturing costs related to plating and the like can be reduced.

In particular, even when an expensive plate with relatively high conductivity or an expensive plate with relatively high solder wettability is adopted as the plate to be used in plating, since a portion where the plating is to be performed is limited to a part of the surface of each of the fittings 212 and 214, manufacturing costs can be reduced effectively.

Furthermore, when plating is partially performed on the surface of each of the fittings 212 and 214, plating is performed on at least the wall surface S11 which includes the first contact point (main contact point) P1 capable of coming into contact with the counterpart-side second terminal 218 in the wall 294 of the first terminal 216 and the wall surface S16 which includes the first contact point (main contact point) P3 capable of coming into contact with the counterpart-side first terminal 216 in the wall 296 of the second terminal 218.

In addition, plating is performed on the exposed surface S13 which does not come into contact with the first housing 208 in the wall 288 of the first terminal 216 and on the exposed surface S18 which does not come into contact with the second housing 210 in the wall 298 of the second terminal 218.

At this point, the wall 294 of the first terminal 216 functions as an elastic contact piece including the first contact point (main contact point) P1 capable of elastically coming into contact with the counterpart-side second terminal 218 and the thickness T17 of the plated portion which has been plated on the wall surface S11 of the wall 294 is set to be greater than the thickness T18 of a plated portion which has been plated on the exposed surface S13 of the wall 288 of the first terminal 216 (T17>T18).

Accordingly, electrical resistance of the wall surface S11 of the wall 294 of the first terminal 216 which includes the first contact point (main contact point) P1 that independently comes into contact with the counterpart-side second terminal 218 can be reduced and conductivity can be improved.

In a similar manner, the thickness T21 of the plated portion which has been plated on the wall surface S16 of the wall 296 of the second terminal 218 including the first contact point (main contact point) P3 capable of elastically coming into contact with the counterpart-side first terminal 216 is set greater than the thickness T22 of the plated portion which has been plated on the exposed surface S18 of the wall 298 of the second terminal 218 (T21>T22).

Accordingly, electrical resistance of the wall surface S16 of the wall 296 of the second terminal 218 which includes the first contact point (main contact point) P3 that independently comes into contact with the counterpart-side first terminal 216 can be reduced and conductivity can be improved.

On the other hand, the plating thicknesses (thicknesses T18 and T22) on the exposed surfaces S13 and S18 of the walls 288 and 298 of the terminals 216 and 218 which do not come into contact with each of the housings 208 and 210 and which hardly contribute to conductivity to the counterpart terminals 216 and 218 as compared to the walls 294 and 296 of each of the terminals 216 and 218 can be reduced and manufacturing costs related to plating and the like can be reduced.

As a result, manufacturing costs can be reduced while improving electrical characteristics of the electrical connector 200 by performing partial plating for each part of the terminals 216 and 218 of each of the fittings 212 and 214 to be integrally molded with and held by each of the housings 208 and 210 by weighting plating thickness in accordance with an application of the part.

In addition, with the electrical connector 200 according to the present embodiment, the thicknesses T1 and T5 of the plated portions having been plated on the mounting surfaces S3 and S5 of the mounting portions 246 and 256 of each of the terminals 216 and 218 are set smaller than the thicknesses T17 and T21 of the plated portions on the wall surfaces S11 and S16 of the walls 294 and 296 of each of the terminals 216 and 218 and greater than the thicknesses T18 and T22 of the plated portions on the exposed surfaces S13 and S18 of the walls 288 and 298 of each of the terminals 216 and 218 (T17>T1>T18 and T21>T5>T22).

Accordingly, solder wettability of the plated portions with the thicknesses T1 and T5 on the mounting surfaces S3 and S5 in the mounting portions 246 and 256 of each of the terminals 216 and 218 can be made favorable.

Therefore, the mounting portions 246 and 256 of the terminals 216 and 218 of each of the fittings 212 and 214 held by the each of the housings 208 and 210 of the electrical connector 200 can be securely fixed to the mounted portions 2A and 2B of the mounted object 2 and the electrical connector 200 can be reliably mounted to the mounted object 2.

In addition, by setting the thicknesses T17 and T21 of the plated portions on the wall surfaces S11 and S16 in the walls 294 and 296 of each of the terminals 216 and 218 greater than the thicknesses T1 and T5 of the plated portions having been plated on the mounting surfaces S3 and S5 of the mounting portions 246 and 256 of each of the terminals 216 and 218, electrical resistance of the wall surfaces S11 and S16 of the walls 294 and 296 of each of the terminals 216 and 218 can be reduced and conductivity can be improved.

Furthermore, by making the plating thicknesses (thicknesses T18 and T22) on the exposed surfaces S13 and S18 in the walls 288 and 298 of each of the terminals 216 and 218 smaller than the thicknesses T1 and T5 of the plated portions having been plated on the mounting surfaces S3 and S5 of the mounting portions 246 and 256 of each of the terminals 216 and 218, the plating thicknesses (thicknesses T18 and T22) on the exposed surfaces S13 and S18 in the walls 288 and 298 of each of the terminals 216 and 218 can be reduced and manufacturing costs related to plating and the like can be reduced.

Furthermore, with the electrical connector 200 according to the present embodiment, the thicknesses T19 and T23 of the plated portions having been plated on the wall surfaces S12 and S17 of the walls 290 and 300 of each of the terminals 216 and 218 including the second contact points (sub contact points) P2 and P4 which do not come into contact or which are capable of coming into contact in an auxiliary manner with the counterpart terminals 216 and 218 are equal to or smaller than the thicknesses T17 and T21 of the plated portions on the wall surfaces S11 and S16 of the walls 294 and 296 of each of the terminals 216 and 218 and greater than the plating thicknesses (thicknesses T18 and T22) on the exposed surfaces S13 and S18 of the walls 288 and 298 of each of the terminals 216 and 218 (T17≥T19>T18 and T21≥T23>T22). Alternatively, the thicknesses T19 and T23 are equal to or greater than the thicknesses T17 and T21 (T19≥T17 and T23≥T21).

Accordingly, while reducing electrical resistance of the wall surfaces S11 and S16 including the first contact points (main contact points) P1 and P3 of the walls 294 and 296 of each of the terminals 216 and 218 and improving conductivity, electrical resistance can also be reduced and conductivity can also be improved with respect to the wall surfaces S12 and S17 of the walls 290 and 300 of the terminals 216 and 218 including the second contact points (sub contact points) P2 and P4 which do not come into contact or which are capable of coming into contact in an auxiliary manner with the counterpart terminals 216 and 218.

In addition, by making the plating thicknesses (thicknesses T18 and T22) on the exposed surfaces S13 and S18 in the walls 288 and 298 of each of the terminals 216 and 218 smaller than the thicknesses T17 and T21 of the plated portions having been plated on the wall surfaces S11 and S16 of the walls 294 and 296 of the terminals 216 and 218 and the thicknesses T19 and T23 of the plated portions having been plated on the wall surfaces S12 and S17 in the walls 290 and 300 ($T17 \geq T19 > T18$ and $T21 \geq T23 > T22$), manufacturing costs related to plating and the like can be reduced.

Furthermore, with the electrical connector 200 according to the present embodiment, since consideration need not be given to conductivity and solder wettability with respect to the wall surfaces S14, S15, S19, and S20 of the walls 286 and 290 of each of the terminals 216 and 218 which only function as contact surfaces that come into contact with a part of each of the housings 208 and 210, the thicknesses T20 and T24 of the plated portion to be plated are set to 0 ($T20 = T24 = 0$).

Accordingly, plating can be omitted and manufacturing costs can be reduced.

Next, with the electrical connector 200 according to the present embodiment, partial plating by, as a minimum, so-called "gold plating" in which gold (Au) is adopted is performed for each of the plurality of terminals 216 and 218 of each of the fittings 212 and 214.

With such gold plating, conductivity and durability in each of the terminals 216 and 218 of each of the fittings 212 and 214 can be maintained.

In addition, limiting plating that adopts relatively expensive gold plating to partial locations can reduce manufacturing costs.

In addition, with the electrical connector 200 according to the present embodiment, partial plating is performed for each of the plurality of terminals 216 of the fitting 212 of the receptacle connector 204.

Accordingly, in the receptacle connector 204, manufacturing costs can be reduced while maintaining conductivity and durability in each of the terminals 216 of the fitting 212.

Furthermore, with the electrical connector 200 according to the present embodiment, partial plating is performed for each of the plurality of terminals 218 of the fitting 214 of the plug connector 206.

Accordingly, in the plug connector 206, manufacturing costs can be reduced while maintaining conductivity and durability in each of the terminals 218 of the fitting 214.

What is claimed is:

1. An electrical connector comprising:

a housing including a lengthwise direction, a crosswise direction, and a height direction which are mutually orthogonal; and a fitting held by the housing;

wherein the fitting is integrally molded with the housing by insert molding, the fitting is made of a conductive thin plate-shaped base material held by the housing, and the fitting includes a terminal of which surface is to be partially plated after the insert molding and a reinforcement fitting which is connected to the terminal and which at least reinforces the housing, the terminal includes: a mounting portion; a first wall; a second wall; and a third wall; the mounting portion including a mounting surface which is to be mounted to a mounted object, the first wall being provided so as to extend in a first direction orthogonal to the mounting surface and forming a first wall surface including a first contact point configured to independently come into contact with a counterpart terminal, the second wall being provided so as to oppose the first wall in a second direction orthogonal to the first direction and forming a second wall surface including a second contact point not coming into contact or being configured to come into contact in an auxiliary manner with the counterpart terminal, and the third wall being provided at a distal side end to the mounting portion in the second wall in the first direction and forming an exposed surface being spaced apart from the mounting surface in the first direction and not coming into contact with the housing, the terminal being configured to come into contact with the counterpart terminal by at least two contact points including the first contact point and the second contact point, and a first thickness of a plated portion on the first wall surface is greater than a second thickness of a plated portion on the exposed surface of the third wall.

2. The electrical connector according to claim 1, wherein a third thickness of a plated portion on the mounting surface is smaller than the first thickness and greater than the second thickness.

3. The electrical connector according to claim 1, wherein a fourth thickness of a plated portion on the second wall surface is equal to or smaller than the first thickness and greater than the second thickness, or equal to or greater than the first thickness.

4. An electrical connector comprising:

a housing including a lengthwise direction, a crosswise direction, and a height direction which are mutually orthogonal; and a fitting held by the housing;

wherein the fitting is integrally molded with the housing by insert molding, the fitting is made of a conductive thin plate-shaped base material held by the housing, and the fitting includes a terminal of which surface is to be partially plated after the insert molding and a reinforcement fitting which is connected to the terminal and which at least reinforces the housing, the terminal includes: a mounting portion; a first wall; a second wall; and a third wall; the mounting portion including a mounting surface which is to be mounted to a mounted object, the first wall being provided so as to extend in a first direction orthogonal to the mounting surface and forming a first wall surface including a first contact point configured to independently come into contact with a counterpart terminal, the second wall being provided so as to oppose the first wall in a second direction orthogonal to the first direction and forming a second wall surface including a second contact point not coming into contact or being configured to come into contact in an auxiliary manner with the counterpart terminal; and the third wall being provided at a distal side end to the mounting portion in the second wall in the first direction and forming an exposed surface being spaced apart from the mounting surface in the first direction and not coming into contact with the housing, the terminal being configured to come into contact with the counterpart terminal by at least two contact points including the first contact point and the second contact point, and a first thickness of a plated portion on the mounting surface is greater than a second thickness of a plated portion on the exposed surface.

5. The electrical connector according to claim 4, wherein a third thickness of a plated portion on the first wall surface is greater than the first thickness.

6. The electrical connector according to claim 5, wherein a fourth thickness of a plated portion on the second wall surface is equal to or smaller than the third thickness and greater than the second thickness, or equal to or greater than the third thickness.

7. The electrical connector according to claim 1, wherein the second wall further includes a third wall surface which is provided on an opposite side to the second wall surface in the second direction and which includes a contact surface that comes into contact with a part of the housing, and a thickness of a plated portion on the third wall surface is 0.

8. The electrical connector according to claim 4, wherein the second wall further includes a third wall surface which is provided on an opposite side to the second wall surface in the second direction and which includes a contact surface that comes into contact with a part of the housing, and a thickness of a plated portion on the third wall surface is 0.

9. The electrical connector according to claim 1, wherein the plating is performed by gold plating.

10. The electrical connector according to claim 4, wherein the plating is performed by gold plating.

11. The electrical connector according to claim 1, wherein the electrical connector comprises a receptacle connector, the receptacle connector includes the housing and the fitting held by the housing, the housing includes: a bottom wall; a protruding wall; a peripheral wall; and a fitting depression; the bottom wall being arranged on a mounted portion of the mounted object, the protruding wall protruding in a height direction of the housing from the bottom wall, the peripheral wall including a longitudinal wall and a short-side wall which are provided at an interval on an outer periphery of the protruding wall, and the fitting depression being provided between the protruding wall and the peripheral wall, and the terminal of the fitting is a receptacle terminal, the receptacle terminal includes: the mounting portion; a first wall; the second wall; the third wall; a fourth wall; and a fifth wall; the fourth wall bending in a first height direction of the housing from the mounting portion and extends, the third wall bending in a second height direction on an opposite side to the first height direction from a connecting part with the fourth wall, the second wall extending in the second height direction from a connecting part with the third wall and which opposes the fourth wall, the fifth wall bending toward a center of the receptacle connector from a connecting part with the second wall and extends, and the first wall bending in the first height direction from a connecting part with the fifth wall and extending and being configured to elastically come into contact with a counterpart terminal, and the fitting is held by the housing since the longitudinal wall of the peripheral wall of the housing is provided in an inner area surrounded by the fourth wall, the third wall, and the second wall.

12. The electrical connector according to claim 4, wherein the electrical connector comprises a receptacle connector, the receptacle connector includes the housing and the fitting held by the housing, the housing includes: a bottom wall; a protruding wall; a peripheral wall; and a fitting depression; the bottom wall being arranged on a mounted portion of the mounted object, the protruding wall protruding in a height direction of the housing from the bottom wall, the peripheral wall including a longitudinal wall and a short-side wall which are provided at an interval on an outer periphery of the protruding wall, and the fitting depression being provided between the protruding wall and the peripheral wall, and the terminal of the fitting is a receptacle terminal, the receptacle terminal includes: the mounting portion; a first wall; the second wall; the third wall; a fourth wall; and a fifth wall; the fourth wall bending in a first height direction of the housing from the mounting portion and extends, the third wall bending in a second height direction on an opposite side to the first height direction from a connecting part with the fourth wall, the second wall extending in the second height direction from a connecting part with the third wall and which opposes the fourth wall, the fifth wall bending toward a center of the receptacle connector from a connecting part with the second wall and extends, and the first wall bending in the first height direction from a connecting part with the fifth wall and extending and being configured to elastically come into contact with a counterpart terminal, and the fitting is held by the housing since the longitudinal wall of the peripheral wall of the housing is provided in an inner area surrounded by the fourth wall, the third wall, and the second wall.

13. The electrical connector according to claim 1, wherein the electrical connector comprises a plug connector, the plug connector includes the housing and the fitting held by the housing, the housing includes: a bottom wall; a peripheral wall; and a fitting depression; the bottom wall being arranged on a mounted portion of the mounted object, the peripheral wall protruding in a height direction of the housing from the bottom wall and including a longitudinal wall and a short-side wall, and the fitting depression being provided on an inner peripheral side of the peripheral wall, and the terminal of the fitting is a plug terminal, the plug terminal includes: the mounting portion; the first wall; the second wall; and the third wall; the first wall bending in a first height direction of the housing from the mounting portion and extending, the third wall bending in the crosswise direction of the housing from a connecting part with the first wall and extends, and the second wall extending in a second height direction on an opposite side to the first height direction from a connecting part with the third wall and which opposes the first wall, and the fitting is held by the housing since the longitudinal wall of the peripheral wall of the housing is provided in an inner area surrounded by the first wall, the third wall, and the second wall.

14. The electrical connector according to claim 4, wherein the electrical connector comprises a plug connector, the plug connector includes the housing and the fitting held by the housing, the housing includes: a bottom wall; a peripheral wall; and a fitting depression; the bottom wall being arranged on a mounted portion of the mounted object, the peripheral wall protruding in a height direction of the housing from the bottom wall and including a longitudinal wall and a short-side wall, and the fitting depression being provided on an inner peripheral side of the peripheral wall, and the terminal of the fitting is a plug terminal, the plug terminal includes: the mounting portion; the first wall; the second wall; and the third wall; the first wall bending in a first height direction of the housing from the mounting portion and extending, the third wall bending in the crosswise direction of the housing from a connecting part with the first wall and extends, and the second wall extending in a second height direction on an opposite side to the first height direction from a connecting part with the third wall and which opposes the first wall, and the fitting is held by the housing since the longitudinal wall of the peripheral wall of the housing is provided in an inner area surrounded by the first wall, the third wall, and the second wall.

* * * * *